(12) United States Patent
Nagashima et al.

(10) Patent No.: US 7,364,770 B2
(45) Date of Patent: Apr. 29, 2008

(54) COATED FINE PARTICLES AND METHOD FOR PRODUCING COATED FINE PARTICLES BY REVERSE DIELS-ALDER REACTION

(75) Inventors: Akira Nagashima, Tokyo (JP); Minako Kawabe, Kawasaki (JP); Takayuki Ishikawa, Chiba-ken (JP); Sadayuki Sugama, Tsukuba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/367,542

(22) Filed: Mar. 6, 2006

(65) Prior Publication Data
US 2006/0194056 A1 Aug. 31, 2006

Related U.S. Application Data

(63) Continuation of application No. PCT/JP2005/016982, filed on Sep. 8, 2005.

(30) Foreign Application Priority Data
Sep. 8, 2004 (JP) .............................. 2004-261698

(51) Int. Cl.
B05D 7/00 (2006.01)
B05D 5/04 (2006.01)
(52) U.S. Cl. .................. 427/215; 427/216; 427/220
(58) Field of Classification Search ................ 427/212, 427/215, 216, 220
See application file for complete search history.

(56) References Cited

U.S. PATENT DOCUMENTS

| 4,311,775 A | 1/1982 | Regan ........................ 430/37 |
| 4,313,124 A | 1/1982 | Hara ....................... 346/140 R |
| 4,345,262 A | 8/1982 | Shirato et al. .......... 346/140 R |
| 4,459,600 A | 7/1984 | Sato et al. .............. 346/140 R |
| 4,463,359 A | 7/1984 | Ayata et al. ................. 346/1.1 |
| 4,535,046 A | 8/1985 | Ksaacson et al. ............. 430/78 |
| 4,558,333 A | 12/1985 | Sugitani et al. ......... 346/140 R |
| 4,723,129 A | 2/1988 | Endo et al. .................. 346/1.1 |
| 4,740,796 A | 4/1988 | Endo et al. .................. 346/1.1 |

(Continued)

FOREIGN PATENT DOCUMENTS

JP         48-18186         3/1973

(Continued)

OTHER PUBLICATIONS

Kumano, "Synthesis and physical properties of phthalocyanine pigments," Denshi Shashin Gakkai Shi, vol. 22, Issue 2, 1984, pp. 111-120.

(Continued)

*Primary Examiner*—H. T Le
(74) *Attorney, Agent, or Firm*—Fitzpatrick, Cella, Harper & Scinto

(57) ABSTRACT

An object of the present invention is to provide coated fine particles with a uniform particle size, having stable crystals on the surface, and to provide colored fine particles which exhibit good color development. A recorded image formed by a dispersion and an ink, using the coated fine particles, is provided with good color development and fastness. The present invention provides coated fine particles comprising fine particles as cores, the fine particles having a crystal layer on the surface, respectively.

2 Claims, 7 Drawing Sheets

U.S. PATENT DOCUMENTS

| | | | |
|---|---|---|---|
| 5,078,790 A | 1/1992 | Tochihara et al. | 106/20 |
| 5,080,716 A | 1/1992 | Aoki et al. | 106/20 |
| 5,131,949 A | 7/1992 | Tochihara et al. | 106/20 |
| 5,132,700 A | 7/1992 | Tochihara et al. | 346/1.1 |
| 5,200,164 A | 4/1993 | Medalia et al. | 423/265 |
| 5,213,613 A | 5/1993 | Nagashima et al. | 106/20 R |
| 5,221,334 A | 6/1993 | Ma et al. | 106/20 D |
| 5,258,066 A | 11/1993 | Kobayashi et al. | 106/22 R |
| 5,272,201 A | 12/1993 | Ma et al. | 524/505 |
| 5,296,022 A | 3/1994 | Kobayashi et al. | 106/20 D |
| 5,409,529 A | 4/1995 | Nagashima et al. | 106/22 H |
| 5,451,251 A | 9/1995 | Mafune et al. | 106/22 H |
| 5,478,383 A | 12/1995 | Nagashima et al. | 106/22 H |
| 5,482,545 A | 1/1996 | Aoki et al. | 106/22 K |
| 5,519,085 A | 5/1996 | Ma et al. | 524/503 |
| 5,554,739 A | 9/1996 | Belmont | 534/885 |
| 5,571,311 A | 11/1996 | Belmont et al. | 106/20 R |
| 5,571,313 A | 11/1996 | Mafune et al. | 106/22 H |
| 5,609,671 A | 3/1997 | Nagasawa | 106/20 R |
| 5,733,363 A | 3/1998 | Nagashima et al. | 106/31.43 |
| 5,852,075 A | 12/1998 | Held | 523/161 |
| 5,854,331 A | 12/1998 | Ma et al. | 524/505 |
| 5,865,883 A | 2/1999 | Teraoka et al. | 106/31.32 |
| 5,936,649 A | 8/1999 | Ikeda et al. | 347/87 |
| 6,117,921 A | 9/2000 | Ma et al. | 523/161 |
| 6,153,000 A | 11/2000 | Erdtmann et al. | 106/31.6 |
| 6,387,168 B1 | 5/2002 | Koitabashi et al. | 106/31.6 |
| 6,676,254 B2 | 1/2004 | Nagashima et al. | 347/100 |
| 6,833,158 B2 | 12/2004 | Suzuki et al. | 427/149 |
| 6,966,944 B2 | 11/2005 | Shimomura et al. | 106/31.43 |
| 7,008,671 B2 | 3/2006 | Ishikawa et al. | 427/152 |
| 7,090,719 B2 | 8/2006 | Ishikawa et al. | 106/31.49 |
| 7,125,111 B2 | 10/2006 | Udagawa et al. | 347/100 |
| 7,128,779 B2 | 10/2006 | Osumi et al. | 106/31.52 |
| 7,141,105 B2 | 11/2006 | Udagawa et al. | 106/31.49 |
| 7,144,449 B2 | 12/2006 | Udagawa et al. | 106/31.15 |
| 7,185,978 B2 | 3/2007 | Nagashima et al. | 347/100 |
| 7,195,340 B2 | 3/2007 | Nagashima et al. | 347/56 |
| 7,195,665 B2 | 3/2007 | Osumi et al. | 106/31.47 |
| 7,208,033 B2 | 4/2007 | Kawabe et al. | 106/31.48 |
| 7,211,120 B2 | 5/2007 | Ishikawa et al. | 8/478 |
| 2003/0187250 A1 | 10/2003 | Ishikawa et al. | 540/129 |
| 2004/0141036 A1 | 7/2004 | Ishikawa | 347/97 |
| 2005/0005818 A1 | 1/2005 | Sato et al. | 106/31.27 |
| 2005/0088501 A1 | 4/2005 | Nagashima et al. | 347/100 |
| 2005/0191446 A1 | 9/2005 | Ishikawa et al. | 428/32.34 |
| 2005/0204955 A1 | 9/2005 | Nagashima et al. | 106/31.59 |
| 2005/0284332 A1 | 12/2005 | Shinjo et al. | 106/31.27 |
| 2006/0007288 A1 | 1/2006 | Takada et al. | 347/100 |
| 2006/0011097 A1 | 1/2006 | Tsuji et al. | 106/31.48 |
| 2006/0012657 A1 | 1/2006 | Nagashima et al. | 347/100 |
| 2006/0021545 A1 | 2/2006 | Nagashima et al. | 106/31.27 |
| 2006/0075584 A1 | 4/2006 | Ishikawa et al. | 8/478 |
| 2006/0096498 A1 | 5/2006 | Tsujimura et al. | 106/31.27 |
| 2006/0098067 A1 | 5/2006 | Imai et al. | 347/100 |
| 2006/0098068 A1 | 5/2006 | Hakamada et al. | 347/100 |
| 2006/0100311 A1 | 5/2006 | Tokuda et al. | 523/160 |
| 2006/0103703 A1 | 5/2006 | Nito et al. | 347/100 |
| 2006/0103704 A1 | 5/2006 | Hakamada et al. | 347/100 |
| 2006/0109322 A1 | 5/2006 | Nakazawa et al. | 347/95 |
| 2006/0109326 A1 | 5/2006 | Nakazawa et al. | 347/101 |
| 2006/0125896 A1 | 6/2006 | Aikawa et al. | 347/100 |
| 2006/0137570 A1 | 6/2006 | Osumi et al. | 106/31.27 |
| 2006/0139429 A1 | 6/2006 | Osumi et al. | 347/100 |
| 2006/0142417 A1 | 6/2006 | Kaneko et al. | 523/160 |
| 2006/0152570 A1 | 7/2006 | Ishikawa et al. | 347/105 |
| 2006/0191440 A1 | 8/2006 | Ishikawa et al. | 106/31.46 |
| 2006/0192827 A1 | 8/2006 | Takada et al. | 347/100 |
| 2006/0194897 A1 | 8/2006 | Kawabe et al. | 523/160 |
| 2006/0234018 A1 | 10/2006 | Nagashima et al. | 428/195.1 |
| 2006/0269876 A1 | 11/2006 | Ishikawa et al. | 430/312 |
| 2007/0029522 A1 | 2/2007 | Udagawa et al. | 252/301.16 |
| 2007/0034114 A1 | 2/2007 | Udagawa et al. | 106/31.15 |
| 2007/0093386 A1 | 4/2007 | Ishikawa et al. | 503/227 |

FOREIGN PATENT DOCUMENTS

| | | |
|---|---|---|
| JP | S59-123670 | 7/1984 |
| JP | S64-26444 | 1/1989 |
| JP | H05-72773 | 3/1993 |
| JP | H05-179183 | 7/1993 |
| JP | H06-100787 | 4/1994 |
| JP | H06-136311 | 5/1994 |
| JP | H07-053841 | 2/1995 |
| JP | H07-61117 | 3/1995 |
| JP | H08-003498 | 1/1996 |
| JP | H09-328621 | 12/1997 |
| JP | H10-31275 | 2/1998 |
| JP | H10-87768 | 4/1998 |
| JP | H11-043639 | 2/1999 |
| JP | H11-236502 | 8/1999 |
| JP | H11-241032 | 9/1999 |
| JP | H11-269418 | 10/1999 |
| JP | H11-349877 | 12/1999 |
| JP | 2000-290532 | 10/2000 |
| JP | 2001-49146 | 2/2001 |
| JP | 2002-363442 | 12/2002 |
| JP | 2003-003084 | 1/2003 |
| JP | 2003-160738 | 6/2003 |
| JP | 2003-327588 | 11/2003 |
| JP | 2004-262807 * | 9/2004 |
| WO | WO 92/01753 | 2/1992 |

OTHER PUBLICATIONS

Senryo-to-Yakuhin, "Dyestuffs and Chemicals," vol. 24, Issue 6, 1984, pp. 122-128.

Almqvist et al., "Synthesis of Optically Active *endo, endo* Bicyclo[2.2.2]octane-2,5-diol, Bicyclo[2.2.2]octane-2,5-dione, and Related Compounds," J. Org. Chem. vol. 61, No. 11, 1996, pp. 3794-3798 and 6 pages of NMR spectra.

International Preliminary Report on Patentability and Written Opinion of the International Searching Authority for PCT/JP2005/016982 (10 pages).

* cited by examiner

COATED FINE PARTICLES AND METHOD FOR PRODUCING COATED FINE PARTICLES BY REVERSE DIELS-ALDER REACTION

This application is a continuation of International Application No. PCT/JP2005/016982 filed on Sep. 8, 2005, which claims the benefit of Japanese Patent Application No. 2004-261698 filed on Sep. 8, 2004.

BACKGROUND OF THE INVENTION

1. Field of the Invention

The present invention relates to coated fine particles, dispersed fine particles, a method for producing coated fine particles, an ink, a recording method and recorded images, and in particular to coated fine particles containing fine particles as the cores and having a crystal layer of a compound formed on the surface of the fine particles, a dispersion using the coated fine particles, a method for producing the coated fine particles, an ink using the coated fine particles, and a recording method and a recorded image using the ink.

2. Related Background Art

To date, dyes have been used as coloring materials for ink-jet recording liquid (ink) requiring high definition. Ink using a dye provides images with features such as high degree of transparency, high definition and superior color development, but in many cases it is inferior in image fastness such as light fastness and water resistance. In recent years, to cope with the inferiority in light fastness and water resistance of the image, pigment inks have been manufactured that use in place of dyes organic pigments and carbon black as coloring materials. Thus coloring materials used for inks have been shifting from dye to pigment in view of enhancing image fastness, and, for example, the following various proposals have been made.

For example, there have been proposed a compound which is prepared to have a structure with a group compatible with a given solvent and thus is soluble in the solvent, and in which the group compatible with the solvent may be eliminated by retro Diels-Alder reaction resulting in an irreversible decrease in the solubility in the solvent, and an ink using the compound (see Japanese Patent Application Laid-Open No. 2003-327588). When this compound is used as the coloring material, it is dissolved in an ink solvent (i.e., in dye-like state), but it may be made insoluble (i.e., in pigment state) in the solvent to increase image fastness when applied onto a recording material and subjected to retro Diels-Alder reaction. However, this proposed method requires means to apply external energy, such as heating, and light, electromagnetic wave and radiation irradiation, to produce the above reaction of the compound dissolved in a solvent (i.e., in dye-like state) when applied onto a recording material.

In addition, there has been proposed a phase change ink that uses a polymerization compound capable of thermally reversible Diels-Alder reaction as a viscosity temperature control material for an ink-jet ink carrier (see Japanese Patent Application Laid-Open No. H11-349877). This proposed method is disadvantageous in that due to reversible reaction, cooling under a reduced solubility condition can induce cyclization and cause solubility to increase. In addition, there has been proposed a method by which a compound (dye) undergoing retro Diels-Alder reaction is applied onto a recording medium containing a metal compound, and the compound (dye) undergoing retro Diels-Alder reaction is subjected to retro Diels-Alder reaction to form a pigment (see Japanese Patent Application Laid-Open No. 2004-262807). Although the resultant pigment has been converted on the recording medium to a pigment insoluble in the solvent, the resultant image is subject to considerable color irregularities. Examination of the recorded image with various observation apparatus such as X-ray diffractometer revealed heterogeneous pigment formation, mixed crystals and aggregation, and indicated the necessity for single crystallization of pigment to provide satisfactory recorded images.

In addition, there has been proposed a method of controlling polarity (solubility, cohesiveness) that uses decomposition reaction by UV light or heat of a triarylmethane compound, and optically and thermally reversible compounds such as photochromic compounds (see Japanese Patent Application Laid-Open No. H10-31275). Although irreversible state may be formed because the polar region is a system decomposed through radical ion cleavage, oxidation degradation reaction can be induced due to extreme instability of by-product. In addition, because photochromic reaction is a reversible reaction for visible and UV light and heat, maintaining a constant state is difficult.

Furthermore, there has been proposed a method of improving recorded image fastness that causes Diels-Alder reaction of ink when applied onto a recording material (see Japanese Patent Application Laid-Open No. H07-61117). In addition, a method of preventing a yellowing event due to retro Diels-Alder reaction incited by a component of a recording medium has been disclosed that involves potent dienophile contained in the recording medium as a component to produce Diels-Alder reaction (see Japanese Patent Application Laid-Open No. S64-26444).

Some pigments consisting of crystals have two or more crystal types even when the chemical formula, composition and structure are the same, and are referred to as polymorph. Examples include types α, β and ε of phthalocyanine blue, and these have different absorption coefficients and refractive indices and hence different hues and opacifying properties. Organic pigments are not only used in the coating industry as coloring material but also in the electronics industry, for example, as a charge generation agent for electrophotographic photosensitive members, a recording medium coloring matter for CD-R and DVD-R, a coloring agent for toner and ink-jet printer inks, a color filter coloring matter for liquid crystal display devices, and a luminescent material for organic EL devices. To use organic pigments for the uses above, it is first important that they have high purity and specific absorption characteristics. Absorption characteristics depend on the chemical structure, particle size, crystal type and purity of the pigment. Many organic pigments in particular have a plurality of crystal types even when the chemical structure is identical, so ensuring high purity while controlling the crystal type is an important point in developing a novel organic pigment.

For example, various organic pigments have been used as a charge generation material for electrophotographic photosensitive members, and there is a strong need for a pigment having high-sensitivity absorption-characteristics for semiconductor laser light and near infrared light, which represents the emission wavelength of LED light. As an organic pigment meeting this requirement, phthalocyanines have been studied extensively. Phthalocyanines vary in absorption spectrum and photoconductivity according to the crystal type as well as the type of the central metal, and according to some reports a specific crystal type has been selected from phthalocyanines with the same central metal for electrophotographic photosensitive members.

For metal-free phthalocyanines, the crystal type X has been reported to have high photoconductivity, and sensitiveness for near infrared light of 800 nm or more, while for copper phthalocyanines, the crystal type $\epsilon$ among many other crystal types has been reported to be sensitive for the longest wavelength. However, type X metal-free phthalocyanine is a metastable crystal type and difficult to manufacture to achieve stable quality, and stable quality one can be obtained with difficulty. Although the $\epsilon$ type of copper phthalocyanine has high spectral sensitivity for longer wavelengths compared to the $\alpha$ and $\beta$ types of copper phthalocyanine, the sensitivity drops sharply at 800 nm compared to 780 nm, and this makes it unfit for use with semiconductor laser with fluctuating emission wavelength. It is known that copper phthalocyanine has electrostatic property, dark decay and sensitivity that can vary significantly depending on whether the crystal type is $\alpha$, $\beta$, $\gamma$ or $\epsilon$ (see, for example, Senryo-to-Yakuhin, Vol. 24, No. 6, p. 122 (1984)), and spectral sensitivity has been also reported to vary because absorption spectrum varies depending on the crystal type (see, for example, Denshi Shashin Gakkai Shi Vol. 22, No. 2, p. 111 (1984)).

Thus the difference in electrical characteristics depending on the crystal type is well known with respect to metal-free phthalocyanines and many other metallophthalocyanines, and much effort has been made to produce a crystal type with satisfactory electrical characteristics. Many pigments are synthesized in water or subsequently treated to form primary particles adjusted for size and shape, and these particles are likely to made coherent in subsequent processes, especially in the drying process, to form secondary particles. It is therefore necessary to deflocculate these particles in the dispersion process.

Examples of general methods for controlling (or refining) the crystal type of an organic pigment include, in addition to the method of controlling the crystal type during the synthesis step, the so-called sulfuric acid method (see Japanese Patent Application Laid-Open No. H05-72773), such as the acid pasting method and the acid slurry method, a method involving dissolving an organic pigment or making it amorphous by grinding methods such as the solvent milling method, the dry milling method and the salt milling method followed by conversion to a desired crystal type (see Shikizai-Kyokai, et al., "41st Ganryo Nyumon Koza-Textbook (1999)"), and a method involving heating dissolution of an organic pigment in solvent under a heating condition followed by slow cooling for crystallization (see Japanese Patent Application Laid-Open No. 2003-160738). In addition, as a method for controlling the crystal type for organic thin film, the method of controlling sublimation temperature to attain a desired crystal type (see Japanese Patent Application Laid-Open No. 2003-003084) is commonly used.

In addition, for metallophthalocyanine compounds, for example, a method has been disclosed in which the central metal is changed to aluminum in the method using copper phthalocyanine as coloring material for the ink used for recording images, in order to improve ozone resistance of recorded images (see, for example, U.S. Pat. No. 4,535,046, Japanese Patent Application Laid-Open Nos. H06-100787, H09-328621 and H11-24132). Furthermore, a method has been disclosed in which a coordinate bond group is linked to the central metal (see, for example, U.S. Pat. Nos. 4,311,775 and 6,153,000, International Publication WO 92/01753). However, in the proposed methods above, it is difficult to increase the purity of the crystal type of resultant metallophthalocyanines and provide crystals of uniform size.

SUMMARY OF THE INVENTION

Thus, an object of the present invention is to provide, unlike conventional fine particles prepared by grinding crystals, uniform and stable crystal-coated fine particles with minimum particle size variation by coating the surface of the fine particles with crystals. It is another object of the invention to provide colored fine particles, which provide a recorded image with satisfactory color development and fastness when is used as a recording material. Other objects of the present invention will also be understood from the following description.

The above objects may be attained by the present invention described below. The present invention provides [1] coated fine particles comprising fine particles as cores, the fine particles having a crystal layer of a compound formed on the surface, respectively.

Preferable forms of the coated fine particles above include the following.

[2] The coated fine particles described in [1] above, wherein the fine particles are charged.

[3] The coated fine particles described in [1] or [2] above, wherein the fine particles are any of metal oxide, metal hydrate and metallic crystals.

[4] The coated fine particles described in [1] above, wherein the crystal layer is a coating made of colored crystals.

[5] The coated fine particles described in [1] above wherein the crystal layer is formed by transforming a molecular structure of a compound.

[6] The coated fine particles described in [1] above, wherein the crystal layer is formed by transforming a molecular structure of a compound using retro Diels-Alder reaction.

[7] The coated fine particles described in [1] above, wherein the crystal layer is formed of crystals derived from a compound that is obtained from a compound precursor having a structure of at least one selected from the general formulas (A-1), (A-2), (A-3) and (A-4):

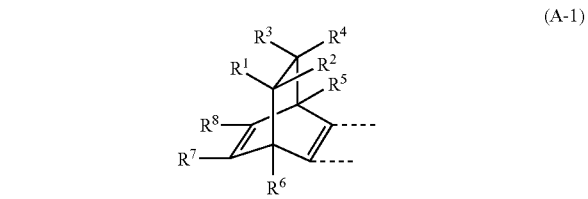

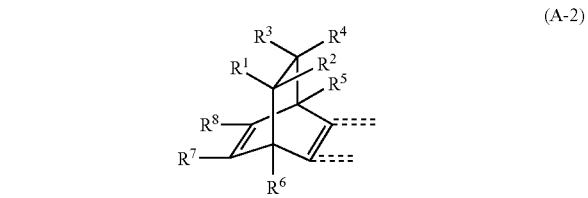

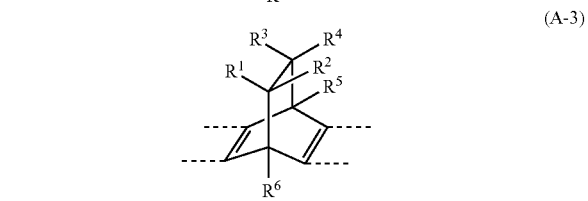

-continued

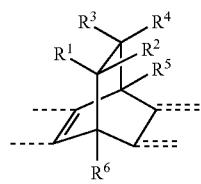

(A-4)

wherein $R^1$ to $R^4$ independently represent a hydrogen atom or a directly or indirectly bonded solvent soluble group, and $R^5$ to $R^8$ independently represent a hydrogen atom or a directly or indirectly bonded substituent, the compound obtained by transforming a molecular structure of the compound precursor using retro Diels-Alder reaction to eliminate a part of the structure.

In another embodiment, the present invention provides [8] dispersed fine particles comprising coated fine particles described in any of [1] to [7] above which have been surface-treated and dispersed in a liquid medium.

In another embodiment, the present invention provides [9] a method for producing coated fine particles, comprising the steps of allowing metal fine particles made of any of metal oxide, metal hydrate and metal crystals to coexist with a compound precursor used for coating the metal fine particles, and forming, around the fine particles, a crystal coating of the compound obtained by transforming a molecular structure of the compound precursor in coexistence with the metal fine particles. In a preferred embodiment, the present invention provides [10] a method for producing coated fine particles, comprising the steps of allowing metal fine particles made of any of metal oxide, metal hydrate and metal crystals to coexist with a compound precursor having a structure of at least one selected from the general formulas (A-1), (A-2), (A-3) and (A-4):

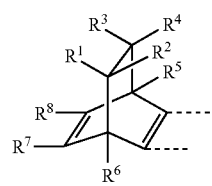

(A-1)

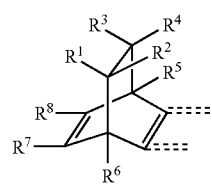

(A-2)

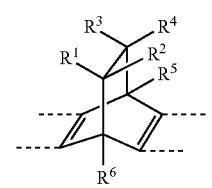

(A-3)

-continued

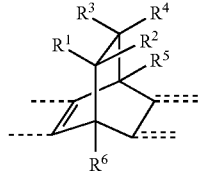

(A-4)

wherein $R^1$ to $R^4$ independently represent a hydrogen atom or a directly or indirectly bonded solvent soluble group, and $R^5$ to $R^8$ independently represent a hydrogen atom or a directly or indirectly bonded substituent, and forming, around the fine particles, a crystal coating derived from a compound obtained from the compound precursor in coexistence with the metal fine particles by transforming a molecular structure of the compound precursor to eliminate a part of the structure.

The above preferred embodiment may include [11] the method for producing coated fine particles according to [10] above, wherein the coated fine particles coexist with the compound precursor in a liquid medium.

In another embodiment, the present invention provides [12] an ink comprising coated fine particles according to any of [1] to [7] above. The above preferred embodiment may include [13] an ink according to [12] above which is a water-soluble ink.

In another embodiment, the present invention provides [14] a recording method, comprising forming an image using an ink according to [12] or [13].

In another embodiment, the present invention provides [15] the recording method according to [14] above, wherein the image is formed by an ink-jet recording system.

In another embodiment, the present invention provides [16] a recorded image which is formed using an ink according to [12] or [13] above.

The present invention provides coated fine particles having a crystal layer formed on the surface thereof, respectively, and colored fine particles with good fastness by coloring the crystals. The present invention also provides fine particles that may be used effectively as toner for an electrophotographic recording method, and are also effective as a carrier of good quality by forming the crystal layer using crystal molecules having semiconductor characteristics. The present invention also provides dispersed fine particles of good quality by dispersing the above coated fine particles in a liquid medium after surface treatment, and also provides recorded materials of good quality, such as color development and fastness, by using the coated fine particles as a coloring material for ink.

DESCRIPTION OF THE PREFERRED EMBODIMENTS

The present invention will be described in more detail below with reference to the preferred embodiments. The coated fine particles of the present invention have fine particles as cores, and crystal layers are formed on the surface of the fine particles. The fine particles used as cores according to the present invention may be an organic compound, an in organic compound or a complex thereof. Most preferably the fine particles may be charged or may be selected as appropriate from metal oxides, metal hydrates and metallic crystals. Preferably the fine particles may be formed by aggregation.

When fine particles made of crystals, such as organic compounds, are formed, a crystallization inhibitor is generally used during crystallization to suppress crystal growth. Using this method, however, it is difficult to attain equal crystal growth in the process starting from the synthesis of a compound forming crystals to crystal growth. In addition, when crystals are synthesized, the presence of various crystal forms makes it difficult to produce crystals free of mixed crystal. The manufacturing method according to the present invention uses fine particles as cores when forming crystal fine particles, and provides crystal fine particles of good quality in the form of coated fine particles having crystals thereon. The method also allows for suppression of size variation of resultant coated fine particles, because fine particles are used as cores. In addition, crystal layers formed on the fine particles are provided through the molecular structure transformation of a precursor incapable forming the crystal layers into a compound capable of forming the crystal layers. Most preferably, when the molecular structure transformation is performed by the retro Diels-Alder reaction, crystals with improved uniformity over conventional crystals may be provided, and even layers of crystals free from mixed crystal (monocrystal layers) may be formed in the case of high-quality crystals.

A preferred method for producing coated fine particles according to the present invention is described below. When forming coated fine particles according to the present invention having fine particles as cores and crystal layers formed on the surfaces of thereof, preferably the crystal layers are formed of a compound which is obtained by the molecular structure transformation of a precursor when the compound forming the crystal layer is in the state of precursor.

Figure 1:
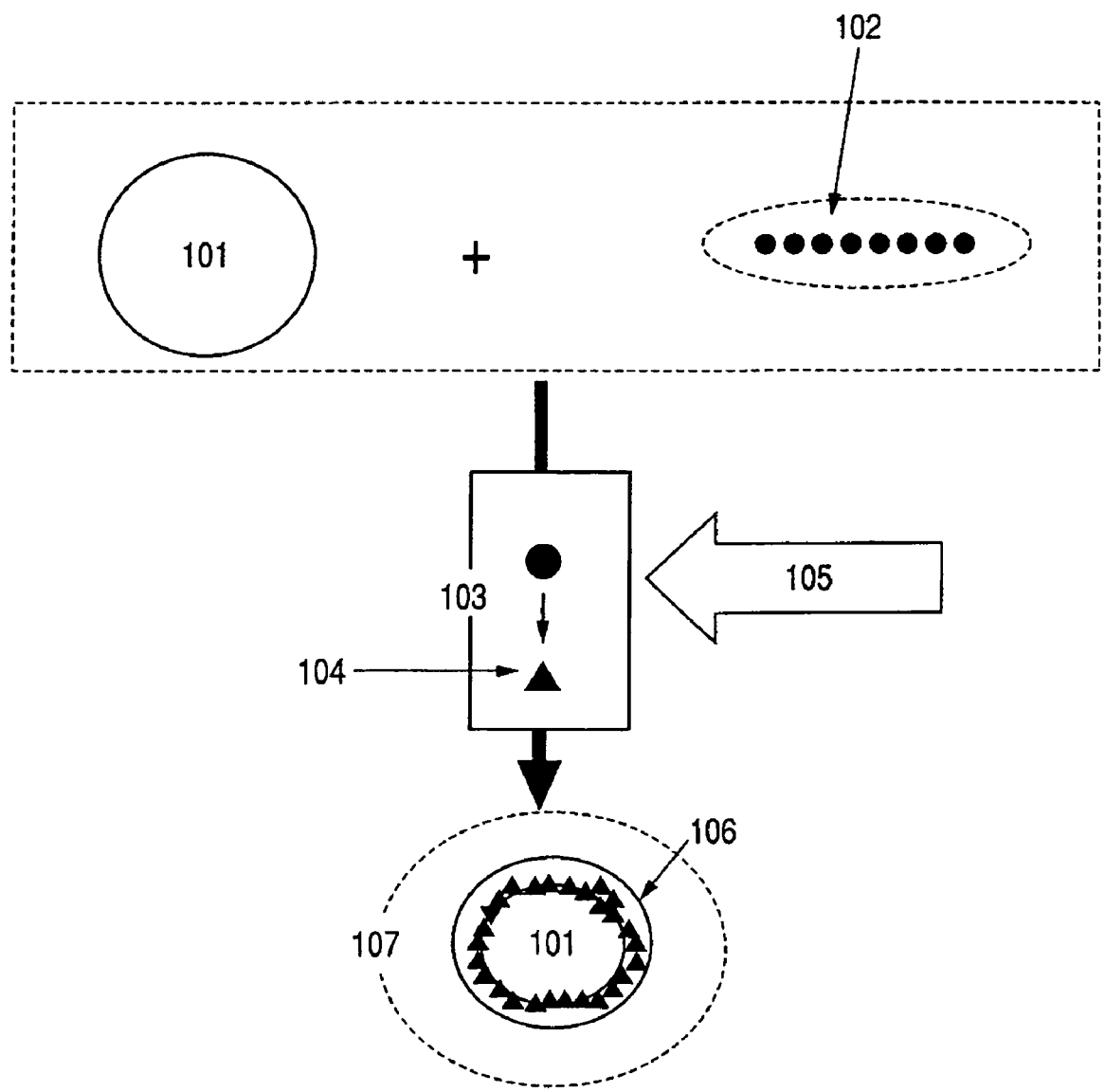
FIG. 1 is a schematic view showing a method for producing coated fine particles according to the present invention.

Most preferably, the molecular structure transformation of the compound is attained using the retro Diels-Alder reaction. Most preferably, the compound precursor constituting the crystal layers described above has a structure represented by at least one general formula selected from the group consisting of (A-1), (A-2), (A-3) and (A-4). The compound precursor is subjected to the retro Diels-Alder reaction to eliminate part of the structure of the compound precursor to form a desired crystal layer formed of the compound, resulting in coated fine particles according to the present invention. An image view is shown in FIG. 1. In the concurrent presence of fine particles 101 serving as cores and a precursor 102 of a compound to form a crystal layer on the surface of the fine particles, external energy 105 is applied to induce molecular structure transformation of the precursor 102 into the compound 104. Furthermore, the compound 104 forms a crystal layer 106 on the fine particle 101, resulting in coated fine particles 107 of the present invention.

In addition, the molecular structure transformation may be performed easily by using an organic compound as the compound forming the crystal layer described above. Moreover, monocrystals of the compound may be obtained easily by using the retro Diels-Alder reaction for the molecular structure transformation.

Figure 2:
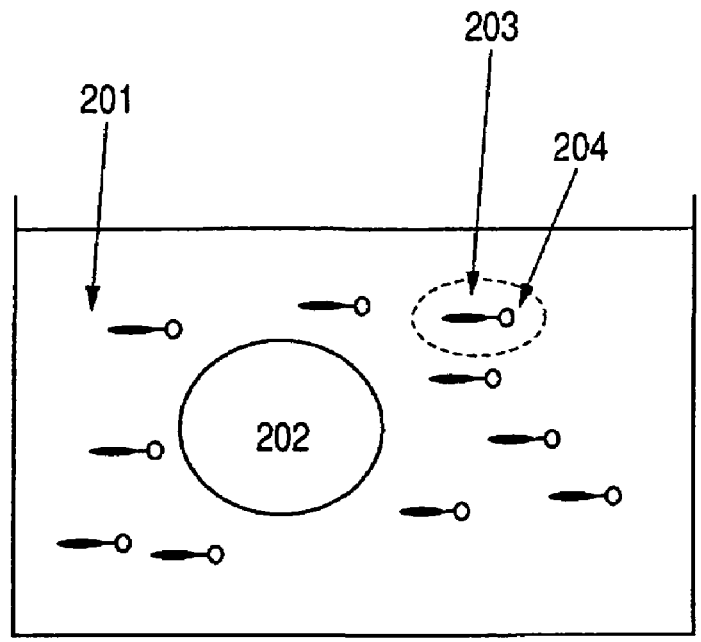
FIG. 2 is an image view showing mixed state before crystal layers are formed on the surface of fine particles.

Concretely, as shown in FIG. 2, a compound 203 (solvent soluble compound) having a solvent soluble group 204 and dissolving in the solvent by the benefit of the solvent soluble group 204 and fine particles 202 are mixed in dissolved state and dispersed state, respectively, in liquid medium 201. In the above mixed liquid state, when the molecular structure of the above compound (solvent soluble compound) is transformed, the solvent soluble group (204 in FIG. 2) is eliminated from the compound (solvent soluble compound 203) in solvent 301 as shown in FIG. 3, and the compound is transformed into a compound 303, which forms a crystal layer 304 as a result of adsorption or reaction due to physical, chemical or electric interaction with the surface of the fine particle, followed by crystallization.

Figure 3:
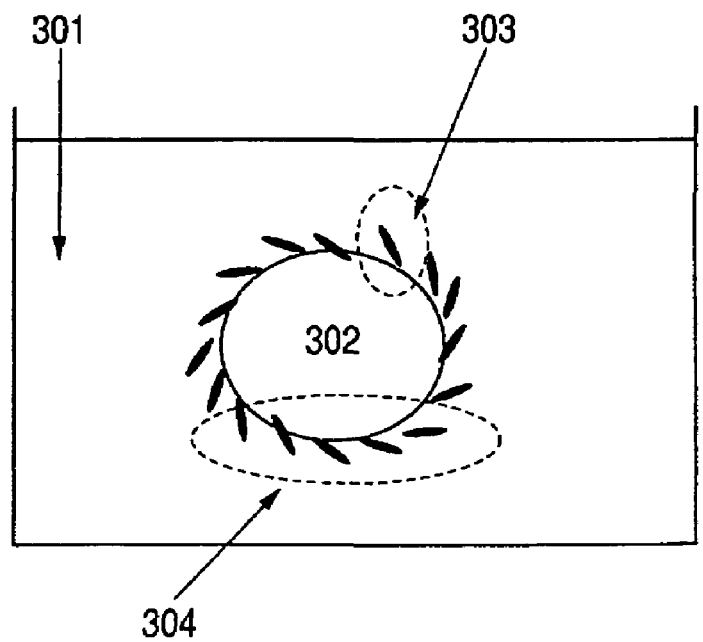
FIG. 3 is an image view showing the formation of crystal layers on the surface of fine particles.

A solvent dispersion may also be produced through concurrent use of a surface treatment agent or a dispersant during the phase shown in FIGS. 2 and 3.

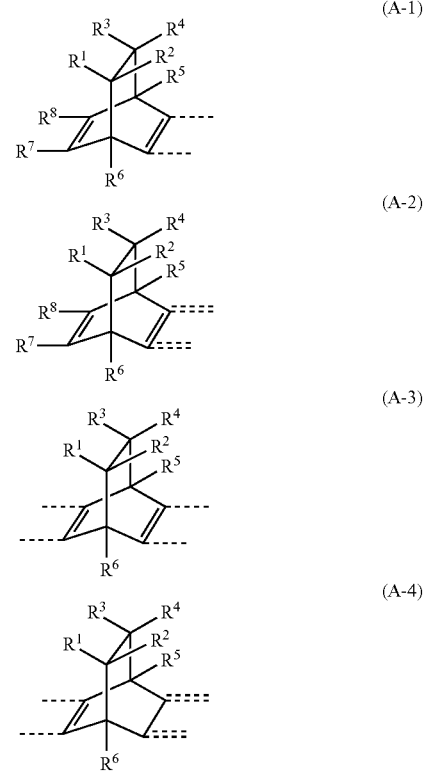

wherein $R^1$ to $R^4$ independently represent a hydrogen atom or a directly or indirectly bonded solvent soluble group, and $R^5$ to $R^8$ represent a hydrogen atom or a directly or indirectly bonded substituent.

Because the resultant coated fine particles have crystals thereon that are bound in chemically, physically or electrically stable manner, a stable crystal layer and hence a crystalline fine particle which is stable with time may be provided.

Molecular structure transformation as used herein refers to a phenomenon in a compound in which when exposed to external energy (agitation, heat energy, light energy or combinations thereof), the molecular structure of the compound changes, such as, for example, a shift from an organic compound with a solvent soluble group to another organic compound without the solvent soluble group as a result of eliminating the solvent soluble group by exposure to energy, and a partial transformation from a multicyclic structure to a stable monocyclic structure by eliminating some atoms.

Figure 4:
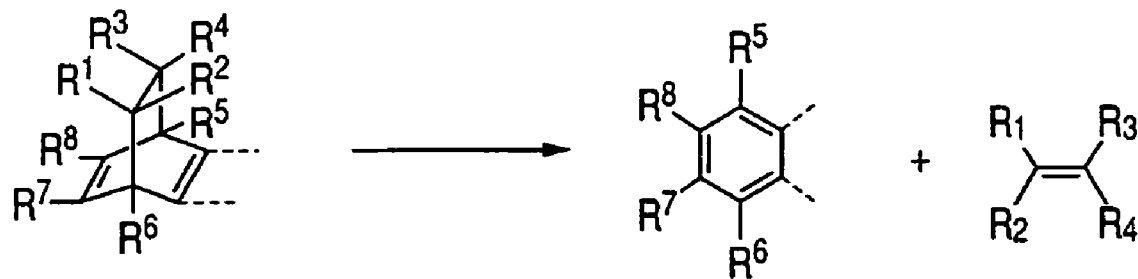
FIG. 4 is an image view describing the retro Diels-Alder reaction according to the present invention.
Figure 5:
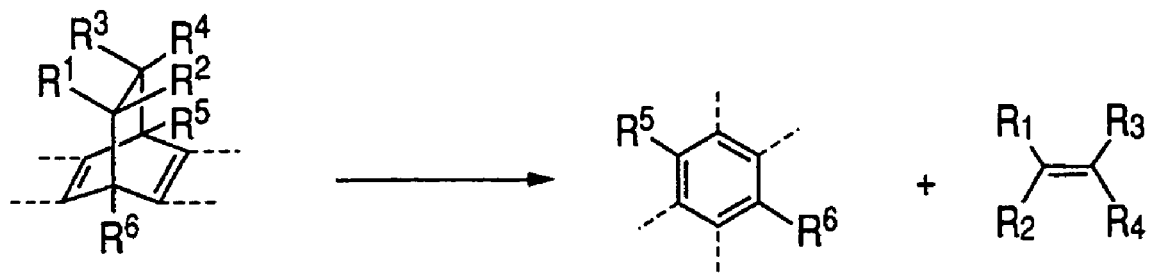
FIG. 5 is an image view describing the retro Diels-Alder reaction according to the present invention.

The retro Diels-Alder reaction as used herein means a reversed reaction of the Diels-Alder reaction, but unlike the general Diels-Alder reaction between diene and dienophile compounds, i.e., an equilibrium reaction (reversible reaction) between exothermic reaction (Diels-Alder reaction) and endothermic reaction (retro Diels-Alder reaction), an aromatic ring is formed as a result of partial elimination of a multicyclic condensed ring structure. This is a preferable molecular structure transformation means of the present invention. For example, as shown in FIGS. 4 and 5, in a compound (precursor compound) having a condensed ring structure of bicyclo-[2,2,2]-octadiene skeleton, the crosslinking portion of the condensed ring structure is detached as an ethylene compound to form an aromatic ring (irreversible reaction).

In addition, the retro Diels-Alder reaction of the present invention means that the above ethylene compound is detached through concerted reaction before the aromatic ring is formed. Concerted reaction refers to a reaction that forms no reactive intermediates, such as ion and radical species, and the elimination reaction of the ethylene compound is accomplished using only molecular constituent elements of the precursor compound. Thus, no impurities associated with the side reaction with the solvent of reaction system are generated during the process of elimination of the ethylene compound from the precursor compound, allowing for the quantitative formation of an aromatic ring in both solid and liquid phases. Given these features, an organic crystal (monocrystal) having extremely high purity may be synthesized by eliminating the ethylene compound from the precursor compound followed by crystallization.

Furthermore, by introducing a substituent that enhances solvent solubility directly or indirectly into the elimination site ($R^1$, $R^2$, $R^3$ and $R^4$ in FIGS. 4 and 5), solvent solubility of a compound may be altered. In this case, an elimination portion with a group providing solvent solubility is detached by the retro Diels-Alder reaction, resulting in a compound (solvent insoluble compound) with a pi-conjugated system. In a preferred aspect, the molecular structure is designed such that the higher structure of a molecule shifts from bulky to flat structure as a result of formation of a pi-conjugated system. This way, the desired association and crystal properties of a compound (solvent insoluble compound) may be attained which is a resultant compound from a precursor compound (solvent soluble compound) according to the present invention by use of the retro Diels-Alder reaction.

In addition, the elimination portion detached from the compound using the retro Diels-Alder reaction according to the present invention may be made extremely stable and safe, and the reaction may be designed to induce no reversible or subsidiary reaction that may have adverse effect on the system.

Figure 6:
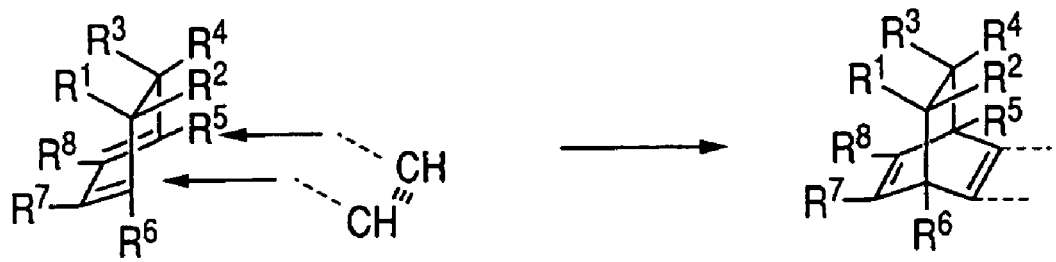
FIG. 6 is an image view describing the Diels-Alder reaction.

In addition, a structural portion undergoing the retro Diels-Alder reaction according to the present invention may be formed using the Diels-Alder reaction shown in FIG. 6. The reason is that because the reaction is an irreversible reaction unlike the general retro Diels-Alder reaction as shown in FIGS. 4 and 5, a stable crystal condition (preferably a homogenized crystal) can be attained.

Furthermore, in the presence of fine particles, the retro Diels-Alder reaction occurring to a structure represented by at least one general formula selected from the group consisting of (A-1), (A-2), (A-3) and (A-4) may proceed at a low energy level, chemical reaction and physical adsorption occur to the fine particles and the contact portion is covered by a compound having the above structure, and the compound having the above structure forms crystals on the surface of the fine particles via the reaction shown in FIGS. 4 or 5, resulting in coated fine particles having fine particles as cores and crystal layers thereon.

When charged fine particles, a metal fine particles made of metal hydrate or metallic crystals, or fine particles with a small particle size are used for the fine particles, a crystal layer may be readily formed on the surface of the fine particle by the action of low energy (for example, reaction initiation energy produced when an electrolytic component or an ionic portion of the central nucleus acts in a catalytic manner, low temperature, or frictional heat between fine particles), because the surface activity of the fine particle increases. A preferred particle size of the fine particles are 100 nm or less for primary particles, and 600 nm or less for secondary particles.

Concrete methods for inducing a molecular structure transformation of a compound having a structure represented by at least one general formula selected from the group consisting of (A-1), (A-2), (A-3) and (A-4) by the retro Diels-Alder reaction, in the presence of fine particles, include, for example, the application of energy conducted by at least one means, selected from heating, or light, electromagnetic wave or radiation irradiation, etc. In addition, if the fine particle having a fine particle as the core and having a crystal layer formed thereon is colored, colored fine particles having an uniform particle size and good stability over time may be obtained. Furthermore, if the compound constituting the monocrystal or crystal layer is a coloring ingredient, a dispersed coloring material of good color tone may be obtained. Dispersion methods that may be employed at that time include generally used methods such as resin dispersion, surfactant dispersion and encapsulation. In addition, effective methods for causing chemical reaction and physical adsorption between the dispersion material and the coated fine particles of the present invention may include a method that involves covering the coated fine particles of the present invention by applying heat or light energy.

As disclosed in Japanese Patent Application Laid-open No. S46-052950, U.S. Pat. Nos. 5,200,164 and 5,554,739, Japanese Patent Application Laid-Open No. H08-003498, and U.S. Pat. No. 5,571,311, specific dispersion methods include a method involving combining a hydrophilic group to the surface of a coloring material via a diazonium group to form a self dispersion pigment followed by dispersion in water, and a method involving oxidizing the surface of a coloring material with hypochlorous acid and so forth before reacting it with a hydrophilic group followed by dispersing in water.

Others include a method that involves including a coloring material in a surfactant or a polymer to form an emulsion or capsule and in this state, dispersing in water, and a method that involves attaching a dispersant such as a surfactant and polymer to the surface of a water-dispersive coloring material by physical adsorption and dispersing in water, as disclosed in Japanese Patent Application Laid-Open Nos. H05-179183, H06-136311, H07-053841, H10-87768, H11-043639, H11-236502 and H11-269418.

Examples of dispersants used in these methods include resins of styrene acrylic acid copolymer and styrene maleic acid copolymers formed by random polymerization or block polymerization; nonionic and anionic surface active agents capable of donating water-dispersive property in micelle and emulsion state; or a block copolymer, random copolymer or graft copolymer consisting of at least two monomers (at least one of which is a hydrophilic monomer) selected from the group consisting of styrene, styrene derivatives, vinylnaphthalene, vinyl naphthalene derivatives, aliphatic alcohol esters of α, β-ethylenically unsaturated carboxylic acid, acrylic acid, acrylic acid derivatives, maleic acid, maleic acid derivatives, itaconic acid, itaconic acid derivatives, fumaric acid, fumaric acid derivatives, vinyl acetate, vinylpyrrolidone, acrylamide and derivatives thereof, or salts thereof. A block copolymer among others is an especially preferable dispersant for practicing the present invention. A water-dispersive coloring material obtained with a block copolymer has little variation among individual water-dispersive coloring materials, providing stable inks.

The block copolymer described above has a structure represented by types AB, BAB, ABC, etc. A block copolymer that has a hydrophobic block and a hydrophilic block as well as equilibrated block size contributing to dispersion stability is particularly advantageous for use with the present invention. The reason is that it has the ability to incorporate a functional group into a hydrophobic block (block to which pigment binds), thereby further enhancing the specific interaction between the dispersant and the pigment, which improves dispersion stability. In addition, the average molecular weight of the polymer may be less than 30,000, preferably less than 20,000, more preferably in the range from 2,000 to 10,000.

Methods for manufacturing these polymers are disclosed, for example, in Japanese Patent Application Laid-Open Nos. H05-179183, H06-136311, H07-053841, H10-87768, H11-043639, H11-236502 and H11-269418.

Representative hydrophobic monomers which may be used for the block copolymer described above include, but not limited to benzyl acrylate, benzyl methacrylate, methyl methacrylate (MMA), ethyl methacrylate (EMA), propyl methacrylate, n-butyl methacrylate (BMA or NBMA), hexyl methacrylate, 2-ethylhexyl methacrylate (EHMA), octyl methacrylate, lauryl methacrylate (LMA), stearyl methacrylate, phenyl methacrylate, hydroxylethyl methacrylate (HEMA), hydroxypropyl methacrylate, 2-ethoxyethyl methacrylate, methacrylonitrile, 2-trimethylsiloxyethyl methacrylate, glycidyl methacrylate (GMA), p-tolyl methacrylate, sorbyl methacrylate, methylacrylate, ethylacrylate, propylacrylate, butylacrylate, hexylacrylate, 2-ethylhexyl acrylate, octylacrylate, lauryl acrylate, stearyl acrylate, phenyl acrylate, 2-phenylethyl methacrylate, hydroxyethyl acrylate, hydroxypropyl acrylate, acrylonitrile, 2-trimethylsiloxy ethylacrylate, glycidyl acrylate, p-tolyl acrylate and sorbyl acrylate. Preferable hydrophobic monomers are benzyl acrylate, benzyl methacrylate, 2-phenylethyl methacrylate, methyl methacrylate, butyl methacrylate and 2-ethylhexyl methacrylate, and homopolymers and copolymers of these monomers, for example a copolymer of methyl methacrylate and butyl methacrylate, are preferably used to produce a block copolymer.

Representative hydrophilic monomers which may be used for the block copolymer described above include, but not limited to: methacrylic acid (MAA), acrylic acid, dimethylaminoethyl methacrylate (DMAEMA), diethylaminoethyl methacrylate, tert-butylaminoethyl methacrylate, dimethylaminoethyl acrylate, diethylaminoethyl acrylate, dimethylaminopropyl methacrylamide, methacrylamide, acrylamide and dimethylacrylamide. Preferably, a homopolymer or copolymer of methacrylic acid, acrylic acid or dimethylaminoethyl methacrylate is used to manufacture a block copolymer.

A polymer containing acid is produced either directly or from a blocked monomer having a blocking group that will be removed after polymerization. Examples of blocked monomers producing acrylic acid or methacrylic acid after removal of the blocking group include trimethylsilyl methacrylate (TMS-MAA), trimethylsilyl acrylate, 1-butoxyethyl methacrylate, 1-ethoxyethyl methacrylate, 1-butoxyethylacrylate, 1-ethoxyethylacrylate, 2-tetrahydropyranyl acrylate and 2-tetrahydropyranyl methacrylate.

The coated fine particles according to the present invention using fine particles as the cores and having crystal layers formed on the surface of the fine particles may be suitably used as a coloring material for ink as a dispersed coloring material (dispersed fine particle) of good color tone as described below. The content of the dispersed coloring material (dispersed fine particle) when the coated fine particles according to the present invention are used as a coloring ingredient for ink is not limited in particular. The content of the dispersed coloring material (dispersed fine particle) in ink may vary depending on the nature of recording material, such as the sizing agent type, the amount of internal addition thereof, or the solvent type contained in the ink, and is for example preferably less than 10% by mass, more preferably less than 4% by mass, in assuming the commonly used recording material and solvent type. In addition, in light of desirable stability as dispersed coloring material, the content is preferably less than 2.5 mass %. The lower limit of the content of the dispersed coloring material (dispersed fine particle) may be varied according to the desired image density.

In addition, when dispersing a dispersant in the coated fine particles by methods using physical adsorption, such as resin dispersion, surfactant dispersion, etc., resin dispersants and surfactants may be used independently or in combination of two or more types, as required. The content of the dispersant used is preferably in the range from 0.5 to 10% by mass, more preferably from 0.8 to 8% by mass, more preferably from 1 to 6% by mass based on the total quantity of the ink. When the content of the dispersant is higher than this range, maintaining the desired ink viscosity may become difficult.

Preferably, a mixture of water, as the main component, and an organic solvent is used as a liquid medium for the ink. As for the organic solvent, preferably, an organic solvent that is miscible in water is used. These include the following organic solvents. For example, amides such as dimethylformamide and dimethylacetamide; ketones such as acetone; ethers such as tetrahydrofuran and dioxane; polyalkylene glycols such as polyethylene glycol and polypropylene glycol; alkylene glycols with an alkylene group containing 2 to 6 carbon atoms, such as ethylene glycol, propylene glycol, butylene glycol, triethylene glycol, 1,2,6-hexane triol, thiodiglycol, hexylene glycol and diethylene glycol; glycerine; lower alkylethers of polyhydric alcohols, such as ethylene glycol monomethyl(ethyl)ether, diethylene glycol monomethyl(ethyl)ether and triethylene glycol monomethyl (ethyl)ether; cyclic amide compounds, such as N-methyl-2-pyrrolidone, 1,3-dimethyl-2-imidazolidinone, triethanolamine, sulfolane, dimethylsulfoxide, 2-pyrrolidone and ε-caprolactam, and imide compounds, such as succinimide.

The content of the organic solvents above is preferably in the range from 1 to 40% by mass, more preferably from 3 to 30% by mass based on the total mass of the ink. In addition, the content of the water in ink may be in the range from 30 to 95 mass %. A content of less than 30 mass % will result in poor solubility of the coloring material as well as increased viscosity of ink. Meanwhile, a content of more than 95 mass % will result in excess quantity of evaporable ingredients leading to insufficient sticking property.

As required, the ink according to the present invention may further contain various kinds of additives such as surfactants, monohydric alcohols, water-soluble organic solvents, anti-rust agents, antiseptics, anti-mold agents, antioxidants, reduction inhibitors, evaporation accelerators, chelating agents, water-soluble polymers, and pH regulators.

The ink according to the present invention preferably has a surface tension of 40 dyn/cm or less. The reason is that a droplet may preferably expand after recording to activate the mechanism described above. In addition, preferably the ink of the present invention has a pH value of 6 to 9 in terms of ink stability.

Furthermore, the ink according to the present invention is preferably used in combination with alkali metal ions and ammonia ions to stabilize the dispersion of coated fine particles in solvent. When both are used in combination for an ink-jet recording system, ink stability and ink ejection characteristics may be improved. Alkali metal ions may include $Li^+$, $Na^+$ and $K^+$.

The aqueous ink composed as above according to the present invention may be used as an ordinary ink for stationery tools, but is particularly effective when used in ink-jet recording systems. Ink-jet recording methods include a recording method that involves ejecting liquid droplets by applying mechanical energy to the ink and an ink jet recording method that involves ejecting liquid droplets due to foaming phenomenon of an ink by applying thermal energy to the ink. The ink of the invention is particularly suitable for use in the ink jet recording method of ejecting ink using thermal energy to cause foaming of the ink, allowing for extremely stable ejection without producing satellite dots. In this case, however, thermal physical properties (for example, specific heat, coefficient of thermal expansion, thermal conductivity) may have to be adjusted.

Furthermore, in light of resolving ink sticking property problems with recorded materials when used with plain paper while improving matching with ink-jet heads, the ink according to the present invention desirably has a surface tension at 25° C. of 30 to 40 dyne/cm, and a viscosity of 15 cP or less, preferably 10 cP or less, more preferably 5 cP or less. Consequently, to attain an ink having the above physical properties to solve the problems occurring when used with plain paper, water content in the ink of the present invention should preferably be 50 to 98 mass %, more preferably 60 to 95 mass %.

The ink according to the present invention is used for heads of ink-jet ejection systems and is also useful as an ink storing container in which the ink is stored or as a refill ink for the container. The present invention is effective in particular when used for bubble-jet® recording heads and recording apparatus among other ink-jet recording systems.

A typical, and preferable configuration or principle has been disclosed, for example, in U.S. Pat. Nos. 4,723,129 and 4,740,796. This system can be applied to any of the so-called on-demand and continuous types, and is particularly useful for the on-demand type, because by applying at least one driving signal that corresponds to the recorded information and provides for a rapid temperature elevation exceeding nuclear boiling to an electrothermal converter placed in correspondence to a sheet or a fluid path retaining ink, thermal energy may be generated in the electrothermal converter, and film boiling may be allowed to occur in the thermal action face of a recording head, resulting in one-on-one correspondence to the driving signal and formation of air bubbles in the ink. The air bubble development and contraction eject ink through an ejection aperture, forming at least one droplet. Preferably, when this driving signal is of pulse form, because immediate air bubble development and contraction are ensured, highly responsive ink ejection can be achieved. Suitable driving signals of pulse form have been disclosed in U.S. Pat. Nos. 4,463,359 and 4,345,262. In addition, conditions described in U.S. Pat. No. 4,313,124, setting forth an invention regarding the rate of temperature rise in the thermal action face, allow for recording of superior quality.

In addition to the recording head configuration disclosed in the specifications of the above patents, combining an ejection aperture, a fluid path and an electrothermal converter (linear or right-angled fluid-path), the present invention is also effective for the configuration of recording head disclosed in U.S. Pat. Nos. 4,558,333 and 4,459,600, which describe a configuration in which a recording head is disposed in a region in which the thermal action part is bent. The present invention is also effective for the configuration (Japanese Patent Application Laid-Open No. S59-123670) in which the electrothermal converter has an ejection part as an ejection aperture common to a plurality of electrothermal converters.

Furthermore, full-line recording heads having a length corresponding to the maximum width of the recording medium that can be recorded by recording equipment may include the configuration disclosed in the specification of the above patents that meets the length by combining a plurality of recording heads and a configuration having one integrally formed recording head, and the present invention can be made more effective using either configuration.

In addition, the present invention is also effective when used with an exchangeable chip type recording head enabling when installed in the main equipment body electric connection to the main equipment body and ink feeding from the main equipment body, and a cartridge type recording head integrally installed in the recording head itself.

In addition, it is preferred to additionally use a recovery means for the recording head and a spare auxiliary means, which are introduced as a component of the recording equipment, because it can make the effects of the present invention more stable. Concretely, these include a capping means, cleaning means, pressurization or aspiration means for the recording head, preheating means involving an electrothermal converter or other heating device, or a combination of these, and auxiliary ejection means for ejecting ink in a mode other than recording.

EXAMPLES

The present invention is further illustrated using the examples and comparative examples below. Unless stated otherwise, "part" and "%" as used herein are presented on a mass basis.

The abbreviations below are used.
THF: tetrahydrofuran
DBU: 1,8-diazabicyclo-[5.4.0]undecene-7

Example 1

(Synthesis of a Precursor of a Phthalocyanine Compound)

Figure 7:
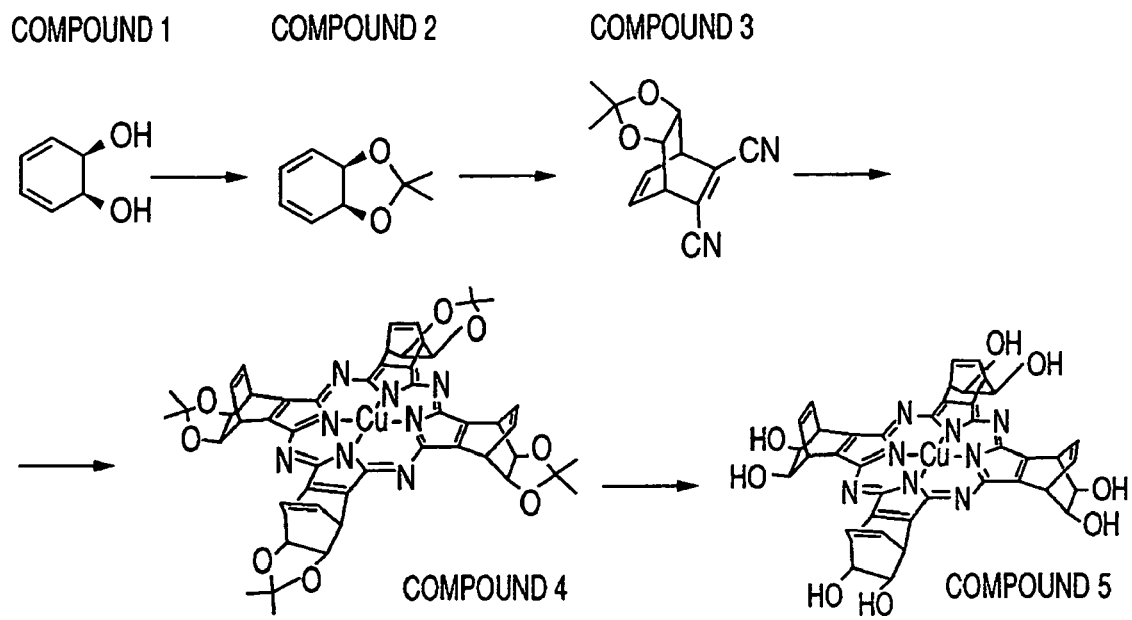
FIG. 7 is a view showing the process of manufacturing a precursor of a metallophthalocyanine compound.

A compound having the structure below was synthesized by the method below. (See the synthesis scheme in FIG. 7)

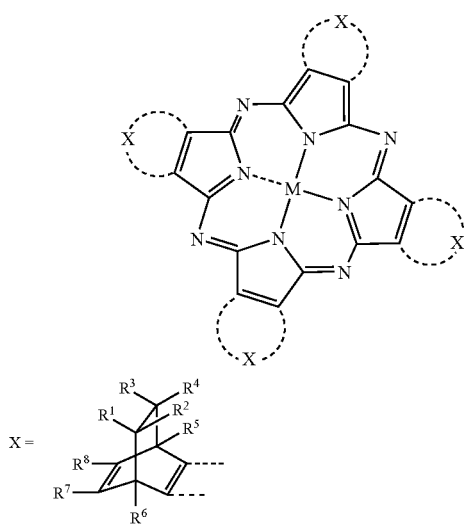

wherein, $R^1$ and $R^3$ represent a hydroxy group, $R^2$, $R^4$, $R^5$, $R^6$, $R^7$ and $R^8$ represent a hydrogen atom. M represents a copper ion.

First, a 20% solution (25 ml) of 1,2-dihydroxy cyclohexa pentadiene (Compound 1) in ethyl acetate was prepared as a raw material, the solvent was concentrated under reduced pressure, and acetone (30 ml), 2,2-dimethoxypropane (69 ml) and a trace amount of p-toluenesulfonic acid were added thereto. Then, the resulting mixture was stirred at room temperature for four hours. A 10% sodium hydroxide solution (30 ml) and saturated salt solution (30 ml) were added and stirred, the reaction was stopped, extraction with diethyl ether (3×30 ml) was performed, the organic layer was washed with saturated salt solution (3×30 ml), dried over anhydrous sodium sulfate and concentrated under reduced pressure to give 8.33 g of Compound 2, a derivative of Compound 1 in which the hydroxy group is protected.

Next, Compound 2 (158 mg) and dicyano acetylene (230 mg) were placed in a reaction vessel, and toluene (2.00 ml) was added and stirred at 90° C. for three hours. After the reaction terminated, the reaction solution was concentrated under reduced pressure, separated by column chromatography (20 to 30% by volume ethyl acetate/hexane), and the Rf 0.24 (20% by volume ethyl acetate/hexane) and Rf 0.18 (20% by volume ethyl acetate/hexane) fractions were concentrated. Recrystallization of those fractions resulted in 184 mg of Compound 3.

mp: 151.9-152.6° C.

1HNMR (solvent: $CDCl_3$, unit: δppm) 7.87 (m, 2H), 7.71 (m, 1H), 7.59 (m, 2H), 6.16 (m, 2H), 4.81 (dd, J=5.6, 2.4 Hz, 1H), 4.33 (dd, J=6.8, 2.9 Hz, 1H), 4.19 (dd, J=6.8, 2.9 Hz, 1H), 4.04 (dd, J=5.6, 1.5 Hz, 1H), 3.70 (m, 1H), 3.48 (m; 1H) 1.28 (s, 3H), 1.22 (s, 3H)

IR (KBr)/cm$^{-1}$ 2981 w, 1552 s, 1313 s, 1151 s, 1056 s, 727.0 m, 601.7 m

In addition, Compound 3 (365 mg) was placed in a reaction vessel, and, after nitrogen purge, dissolved in dry THF (5.00 ml). A solution of n-butoxy magnesium in n-butanol was added thereto and stirred with heating at 150° C., resulting in a 4-membered ring metal complex. After reaction was complete, extraction with ethyl acetate (3×20.0 ml) was performed. The organic layer was washed with a saturated salt solution, dried over anhydrous sodium sulfate, concentrated under reduced pressure, separated by silica gel column chromatography (5 volume % ethyl acetate/chloroform), and the Rf 0.41 fraction (5 volume % ethyl acetate/chloroform) was concentrated and recrystallized to give 283 mg of Compound 4.

mp: 114.9-146.3° C.

1HNMR (solvent: $CDCl_3$, unit: δppm) 8.58 (Br, 1H), 6.68 (d, J=2.4 Hz, 1H), 6.50 (m, 2H), 4.56 (m, 1H) 4.34 (m, 2H), 4.32 (q, J=7.0 Hz, 2H), 4.06 (m, 1H), 1.42 (s, 3H), 1.38 (t, J=7.0 Hz, 3H), 1.30 (s, 3H)

IR (KBr)/cm$^{-1}$ 3345 s, 2892 w, 1681 s, 1297 m, 1141 s, 1039 s

Compound 4 (289 mg) was placed in a reaction vessel, and, after nitrogen purge, dissolved in dry THF (5.00 ml). 1N hydrochloric acid (114 mg) was added thereto and stirred at room temperature for one hour. After the reaction terminated, reaction was stopped with saturated salt solution (20 ml), the reaction solution was washed with sodium thiosulfate solution (50.0 ml) and saturated salt solution (50.0 ml), independently, dried over anhydrous sodium sulfate and concentrated under reduced pressure, and purified by column chromatography and recrystallized, resulting in precursor 5 (yield 39.8%) of a water-soluble phthalocyanine compound, in which the hydroxyl group is deprotected.

(Coated Fine Particle having a Fine Particle Crystal Layer formed by Molecular Structure Transformation of a Precursor of a Phthalocyanine Compound)

Compound 5 prepared above and fine particles (mean particle size of primary particle: 15 nm) consisting of hydrated alumina were added into an aqueous medium of 50 mass % isopropanol, and mixed by stirring at 80° C. in a tightly closed vessel. After the color change of the solvent was stabilized, termination of the molecular structure transformation of the compound was confirmed, heating was stopped, and the solvent evaporated to give coated fine particles of Example 1.

(Manufacture of a Dispersion)

The coated fine particles prepared above was converted into fine particles dispersion by the method below. Using benzyl methacrylate and methacrylic acid as raw material, a Type AB block polymer of an acid value of 250 and a number average molecular weight of 3,000 was prepared by conventional method, neutralized with a potassium hydroxide solution, and diluted in ion-exchange water to give a homogeneous 50 mass % polymer solution.

180 g of the polymer solution described above, 100 g of the coated fine particles and 220 g of ion-exchange water were mixed and stirred mechanically for 0.5 hour. Then, using a micro fluidizer, this mixture was treated by passing through an interaction chamber five times under liquid pressure of about 10,000 psi (about 70 Mpa). In addition, the dispersion liquid prepared above was centrifuged (12,000 rpm, 20 minutes) to remove a non-dispersion including coarse particles, giving solution of a dispersion (A). The resultant fine particle dispersion had a pigment content of 10 mass % and a dispersant content of 10 mass %.

(Preparation of Ink)

The fine particle dispersed fine particle prepared above was used to prepare an ink of the composition below.

| | |
|---|---|
| Dispersion (A) | 13.4% |
| Glycerine | 8% |
| Ethylene glycol | 7% |
| Isopropanol | 1% |
| Pure water | 70.6% |

Example 2

(Synthesis of a Precursor of a Quinacridone Compound)

A compound having the structure below was

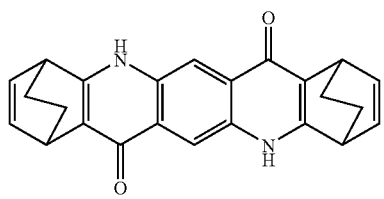

synthesized by the method below. (See the synthesis scheme in FIG. 8)

Figure 8:
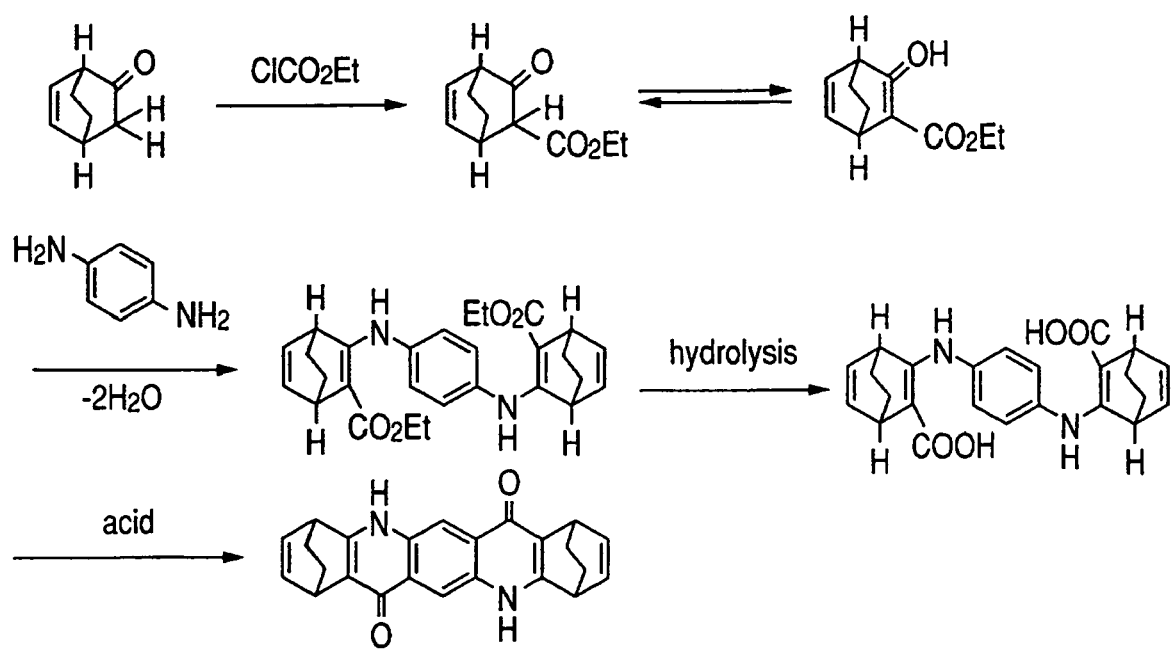
FIG. 8 is a view showing the process of manufacturing a precursor of a quinacridone compound.

A precursor of a quinacridone compound used in the implementation of the manufacturing method according to the present invention was synthesized according to the scheme described in FIG. 8.

First, Compound 1 used for synthesis was synthesized according to J. Org. Chem., Vol. 61, Nov. 11, 1996, pp 3794-3798. Compound 1 represented by [1] in the formula below was then used to synthesize a compound represented by [2] as described below.

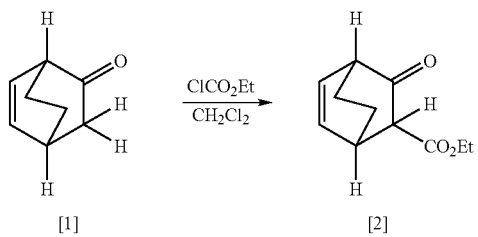

First, Compound 1 [1] (0.318 g, 2.60 mmol) was placed in a 50 ml round-bottom flask and, after nitrogen purge, dry-$CH_2Cl_2$ (2 ml) was added and cooled with a water bath. Separately, ethyl chloroformate (0.284 g, 2.62 mmol) was placed in a 25 ml round-bottom flask, dry-$CH_2Cl_2$ was added after nitrogen purge, and the mixture was added dropwise gradually to the above 50 ml round-bottom flask with a transfer tube, followed by stirring for one hour. After confirming the completion of reaction by TLC (thin layer chromatography), the reaction was stopped and extraction with ethyl acetate was performed. The organic layer from the extraction was washed with 5% HCl, dried over anhydrous sodium sulfate and concentrated under reduced pressure. Purification of the resultant concentrate by silica gel column chromatography (eluent: EtOAc/Hexane) gave the objective compound [2] (0.408 g, yield: 80.8%).

A compound represented by [3] was then synthesized as described below using Compound 2 represented by [2] in the formula below.

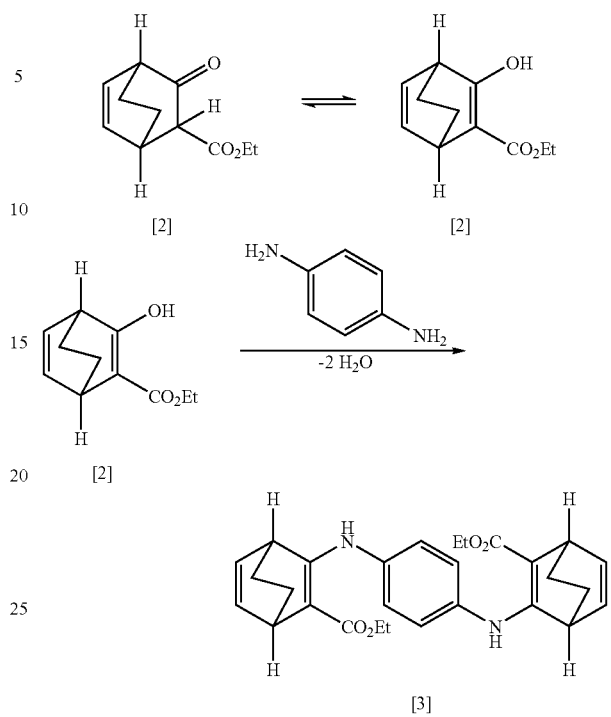

First, after nitrogen purge, dry-$Et_2O$ (5.5 ml) and the compound represented by [2] (0.777 g, 4.00 mmol) were cooled in a 25 ml round-bottom flask. Separately, 1,4-phenylenediamine (0.216 g, 2.00 mmol) was placed in a 25 ml round-bottom flask, dry-$Et_2O$ (2 ml) was added after nitrogen purge, and the mixture was added dropwise to the above flask with a transfer tube, followed by stirring for one hour. After confirming the completion of reaction by TLC, the reaction was stopped, extraction with ethyl acetate was performed, and the organic layer was dried over anhydrous sodium sulfate and concentrated. Purification by silica gel column chromatography (EtOAc/Hexane) gave the objective compound [3] (0.690 g, yield: 75%).

A compound represented by [4] was then synthesized as described below using Compound 3 represented by [3] in the formula below.

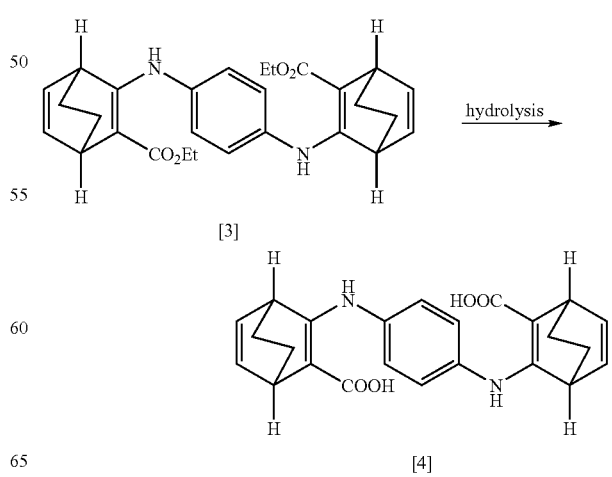

First, the compound represented by [3] (0.921 g, 2.00 mmol) prepared above was dissolved in 30 ml of the solvent DMSO (dimethylsulfoxide) in a 100 ml round-bottom flask. t-Butoxy potassium was added thereto and stirred overnight with heating at 50° C. After the completion of reaction was confirmed by TLC, the reaction was stopped with water and extraction with ethyl acetate was performed. The organic layer from the extraction was dried over anhydrous sodium sulfate and concentrated under reduced pressure. Purification by silica gel column chromatography (EtOH/Hexane) gave the objective compound [4] (0.728 g, yield: 90%).

A compound represented by [5] was then synthesized as described below using Compound 4 represented by [4] in the formula below.

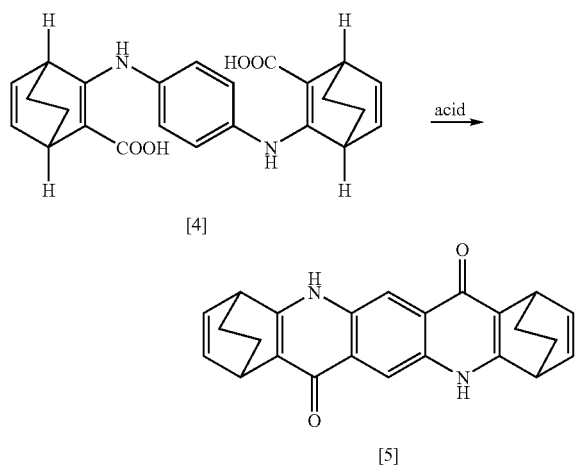

First, the compound represented by [4] (0.808 g, 2.00 mmol) prepared above was dissolved in 30 ml of the solvent dry-DMSO (dimethylsulfoxide) in a 100 ml round-bottom flask. Polyphosphoric acid was added thereto, and stirred overnight with heating at 50° C. After the completion of dewatering cyclization reaction was confirmed by TLC, the reaction was stopped with water and extraction with ethyl acetate was performed. The organic layer from the extraction was dried over anhydrous sodium sulfate and concentrated under reduced pressure. Finally, purification by silica gel column chromatography (EtOAc/Hexane) gave the objective compound [5], a precursor of a quinacridone compound (0.331 g, yield: 45%).

(Coated Fine Particles having a Crystal Layer Formed by Molecular Structure Transformation of a Precursor of a Quinacridone Compound)

Red-colored coated fine particles having crystals formed on the surface was prepared as in Example 1 using precursor 5 of a quinacridone compound prepared above.

(Manufacture of Fine Particles Dispersion)

The coated fine particles prepared above was converted into fine particles dispersion by the method below. Using benzyl methacrylate and methacrylic acid as raw material, a type AB block polymer of an acid value of 250 and a number average molecular weight of 3,000 was prepared by conventional method, neutralized with potassium hydroxide solution, and diluted in ion-exchange water to give a homogeneous 50 mass % polymer solution.

180 g of the polymer solution described above, 100 g of the coated fine particles and 220 g of ion-exchange water were mixed and stirred mechanically for 0.5 hour. Then, using a micro fluidizer, this mixture was treated by passing through an interaction chamber five times under liquid pressure of about 10,000 psi (about 70 Mpa). In addition, the dispersion liquid prepared above was centrifuged (12,000 rpm, 20 minutes) to remove a non-dispersion including coarse particles, giving fine particles dispersion.

(Ink)

The coated fine particles described above having crystal layers was used to manufacture an ink in the same manner as Example 1.

Example 3

(Synthesis of a Precursor of a Porphyrin Compound)

Figure 9:
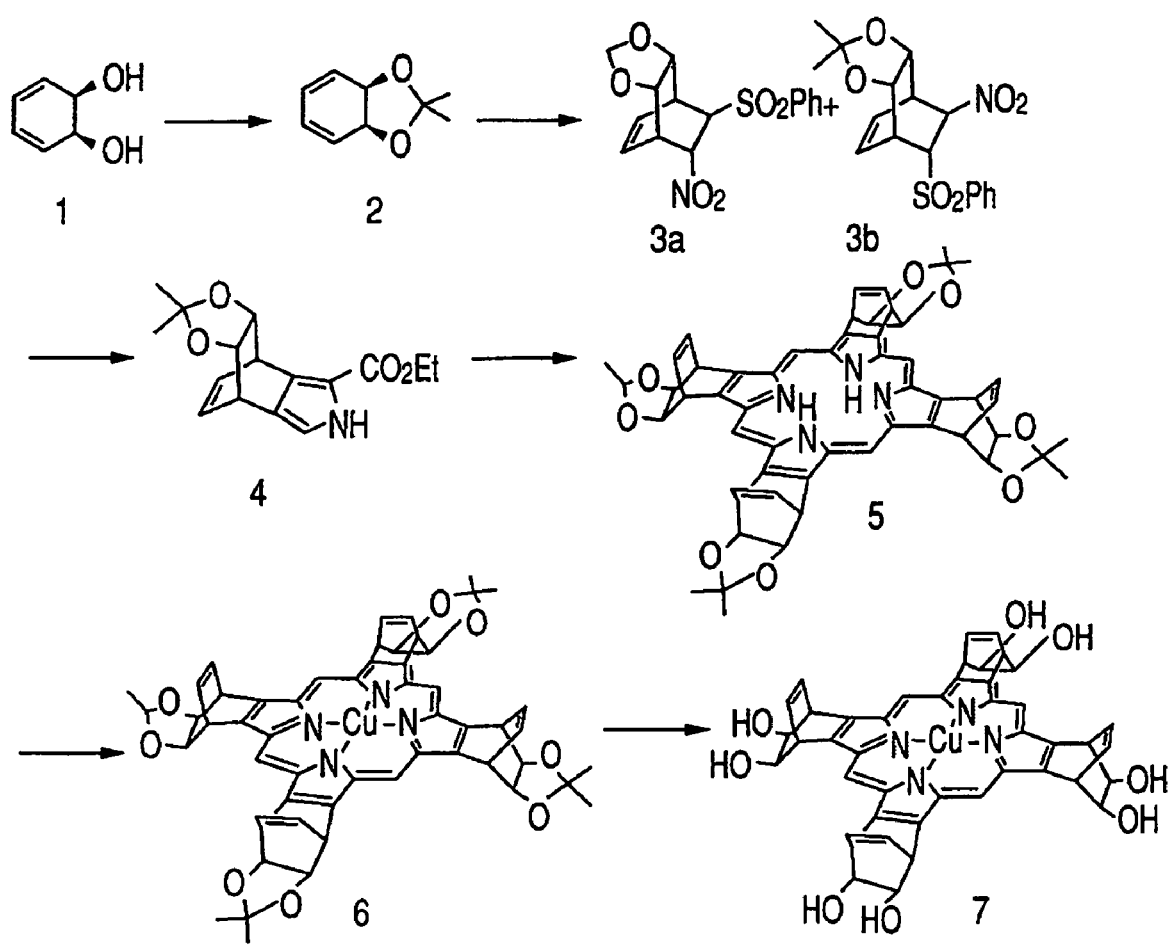
FIG. 9 is a view showing the process of manufacturing a precursor of a porphyrin compound.

A compound having the structure below was synthesized by the method below. (See the synthesis scheme in FIG. 9)

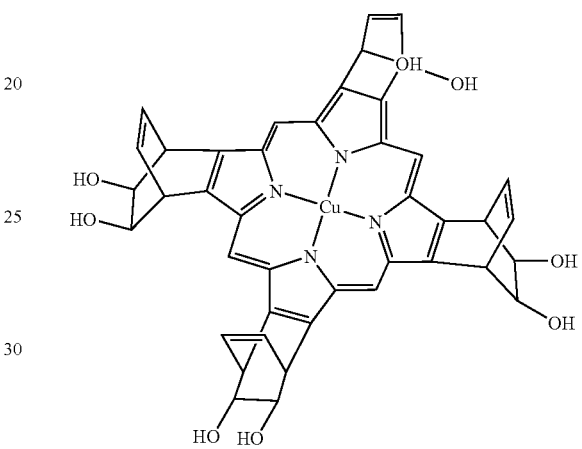

1) Synthesis of Compound 2

First, a 20% solution (25 ml) of 3,5-cylohexadiene-1,2-diol (Compound 1) in ethyl acetate was prepared as a raw material, the solvent was concentrated under reduced pressure, and acetone (30 ml), 2,2-dimethoxypropane (69 ml) and a trace amount of p-toluenesulfonic acid were added thereto and stirred at room temperature for four hours. 10 mass % sodium hydroxide solution (30 ml) and saturated salt solution (30 ml) were added and stirred, the reaction was stopped, extraction with diethyl ether (3×30 ml) was performed, the organic layer was washed with saturated salt solution (3×30 ml), dried over anhydrous sodium sulfate and concentrated under reduced pressure to give 8.33 g of Compound 2, a derivative of Compound 1 in which the hydroxy group is protected.

2) Synthesis of Compound 3

Compound 2 (158 mg, 1.04 mmol) and 2-nitro-1-(phenylsulfonyl)ethylene (230 mg, 1.08 mmol) were placed in a reaction vessel, and toluene (2.00 ml) was added and stirred at 90° C. for three hours. After the reaction terminated, the reaction solution was concentrated under reduced pressure, separated by column chromatography (20 to 30% by volume ethyl acetate/hexane), and the Rf 0.24 (20% by volume ethyl acetate/hexane) and Rf 0.18 (20% by volume ethyl acetate/hexane) fractions were concentrated. Recrystallization resulted in 124 mg (0.339 mmol, yield: 32.6 mass %) and 62 mg (0.17 mmol, yield: 16.3 mass %) of Compounds 3a and 3b, respectively.

mp: 151.9-152.6° C.

1HNMR (solvent:. CDCl$_3$, unit: δppm) 7.87 (m, 2H), 7.71 (m, 1H), 7.59 (m, 2H), 6.16 (m, 2H), 4.81 (dd, J=5.6, 2.4 Hz, 1H), 4.33 (dd, J=6.8, 2.9 Hz, 1H), 4.19 (dd, J=6.8, 2.9 Hz, 1H), 4.04 (dd, J=5.6, 1.5 Hz, 1H), 3.70 (m, 1H), 3.48 (m, 1H) 1.28 (s, 3H), 1.22 (s, 3H)

IR (KBr)/cm$^{-1}$: 2981 w, 1552 s, 1313 s, 1151 s, 1056 s, 727.0 m, 601.7 m.

3) Synthesis of Compound 4

365 mg (1 mmol) of Compounds 3a and 3b (2,2-dimethyl-8-nitro-9-phenylsulfonyl-3a,4,7,7a-tetrahydro-4,7-ethano-1,3-benzodioxol) were placed in a reaction vessel, dissolved in dry-THF (5.00 ml) after nitrogen purge, and the reaction vessel was soaked in ice bath. Dry-ethyl isocyano acetate (0.110 ml, 1.00 mmol) was added, DBU (0.370 ml, 2.50 mmol) distilled by calcium hydride was dropwise added over five minutes, the ice bath was removed, and the mixture was stirred at room temperature for 17 hours. After the reaction terminated, 2 mass % hydrochloric acid (10.0 ml) was added, and extraction with ethyl acetate (3×20.0 ml) was performed. The organic layer was washed with a saturated salt solution, dried over anhydrous sodium sulfate, concentrated under reduced pressure, separated by silica gel column chromatography (5 volume % ethyl acetate/chloroform), and the Rf 0.41 fraction (5 volume % ethyl acetate/chloroform) was concentrated and recrystallized to give 283 mg (97.8 mmol, yield: 97.8 mass %) of Compound 4.

mp: 114.9-146.3° C.

1HNMR (solvent: CDCl$_3$, unit: δppm) 8.58 (Br, 1H), 6.68 (d, J=2.4 Hz, 1H), 6.50 (m, 2H), 4.56 (m, 1H) 4.34 (m, 2H), 4.32 (q, J=7.0 Hz, 2H), 4.06 (m, 1H), 1.42 (s, 3H), 1.38 (t, J=7.0 Hz, 3H), 1.30 (s, 3H)

IR (KBr)/cm$^{-1}$: 3345 s, 2892 w, 1681 s, 1297 m, 1141 s, 1039 s.

4) Synthesis of Compound 5

Compound 4 (289 mg, 1.00 mmol) was placed in a reaction vessel and, after nitrogen purge, dissolved in dry THF (5.00 ml), and the reaction vessel was soaked in ice bath. Lithium hydride aluminum (114 mg, 3.00 mmol) was added and, after removing the ice bath, stirred at room temperature for one hour. After termination of reduction reaction, saturated salt solution (20.0 ml) was added, insolubles were filtered with celite, extraction with chloroform (3×100 ml) was performed, and the extract was dried over anhydrous sodium sulfate. p-toluenesulfonic acid (80.0 mg) was added to the solution, and stirred for one day. Chloranil (223 mg, 0.907 mmol) was then added, and stirred for one more day. After the reaction terminated, the reaction solution was washed with 1 mass % sodium thiosulfate solution (50.0 ml) and saturated salt solution (50.0 ml), independently, dried over anhydrous sodium sulfate and concentrated under reduced pressure, and purified by column chromatography and recrystallized, resulting in Compound 5 (yield 39.8 mass %).

5) Synthesis of Compound 6

Compound 5 and copper acetate were dissolved in chloroform (30 ml)-methanol (3 ml) in a reaction vessel, and stirred at room temperature for three hours. After reaction terminated, the solution was washed with water (100 ml×2) and saturated salt solution (40 ml), independently, dried over anhydrous sodium sulfate and concentrated under reduced pressure, and recrystallization from chloroform-methanol resulted in a reddish violet crystal (Compound 6).

6) Synthesis of Compound 7

Elimination of the protecting group by hydrolytic reaction in the resultant compound 6 in the presence of an acid resulted in the objective precursor 7 (central metal M: Cu) of a porphyrin compound.

(Coated Fine Particles having a Crystal Layer Formed by Molecular Structure Transformation of a Precursor of a Porphyrin Compound)

The precursor of a porphyrin compound prepared above and fine particles (mean particle size of primary particle: 15 nm) consisting of hydrated alumina were added into aqueous medium of 50 weight % isopropanol, mixed by high-speed stirring in a tightly closed vessel, termination of molecular structure transformation of the precursor of a porphyrin compound was confirmed after stabilization of the color change of the solvent, stirring was stopped, and the solvent evaporated to give coated particles of Example 3. In addition, X-ray diffraction of the resultant coated fine particles confirmed the formation of crystals; in FIG. 10, the 2θ portion indicated by 101 represents a crystal peak.

(Preparation of Fine Particles Dispersion)

The coated fine particles prepared above was converted into an aqueous dispersion by the method below. Using benzyl methacrylate and methacrylic acid as raw material, a type AB block polymer of an acid value of 250 and a number average molecular weight of 3,000 was prepared by conventional method, neutralized with potassium hydroxide solution, and diluted in ion-exchange water to give a homogeneous 50 mass % polymer solution.

180 g of the polymer solution described above, 100 g of the coated fine particles and 220 g of ion-exchange water were mixed and stirred mechanically for 0.5 hour. Then, using a micro fluidizer, this mixture was treated by passing through an interaction chamber five times under liquid pressure of about 10,000 psi (about 70 Mpa). In addition, the dispersion liquid prepared above was centrifuged (12,000 rpm, 20 minutes) to remove a non-dispersion including coarse particles, giving fine particles dispersion.

(Ink)

The fine particle dispersion described above was used to manufacture an ink in the same manner as Example 1.

Example 4

The precursor of a porphyrin compound prepared in Example 3 was used to prepare coated fine particles and ink by the following method.

(Coated Fine Particles having a Crystal Layer Formed by Molecular Structure Transformation of a Precursor of a Porphyrin Compound)

The precursor of a porphyrin compound prepared above and fine particles (mean particle size of primary particle: 60 nm) consisting of hydrated alumina were added into aqueous medium of 50 weight % isopropanol, mixed by stirring at 80° C. in a tightly closed vessel, termination of the molecular structure transformation of the precursor of a porphyrin compound was confirmed after stabilization of the color change of the solvent, heating was stopped, and the solvent evaporated to give coated fine particles of Example 4. X-ray diffraction of the resultant coated fine particles confirmed the formation of crystals; in FIG. 11, the 2θ portion indicated by 111 represents a crystal peak.

(Preparation of Fine Particles Dispersion)

The coated fine particles prepared above was converted into fine particles dispersion by the method below. Using benzyl methacrylate and methacrylic acid as raw material, a type AB block polymer of an acid value of 250 and a number average molecular weight of 3,000 was prepared by conventional method, neutralized with potassium hydroxide solution, and diluted in ion-exchange water to give a homogeneous 50 mass % polymer solution.

180 g of the polymer solution described above, 100 g of the coated fine particles and 220 g of ion-exchange water were mixed and stirred mechanically for 0.5 hour. Then, using a micro fluidizer, this mixture was treated by passing through an interaction chamber five times under liquid pressure of about 10,000 psi (about 70 Mpa). In addition, the dispersion liquid prepared above was centrifuged (12,000 rpm, 20 minutes) to remove a non-dispersion including coarse particles, giving fine particles dispersion.

(Ink)

The fine particle dispersion prepared above was used to manufacture an ink in the same manner as Example 1.

Example 5

The precursor of a porphyrin compound prepared in Example 3 was used to prepare coated fine particles, fine particles dispersion and ink by the following method.

(Coated Fine Particles having a Crystal Layer Formed by Molecular Structure Transformation of a Precursor of a Porphyrin Compound)

The precursor of a porphyrin compound prepared above and fine particles (mean particle size of primary particle: 15 nm) consisting of hydrated alumina were mixed with strong shear in a vessel so as to attain a uniform mixture, termination of the molecular structure transformation of the precursor of a porphyrin compound was confirmed after stabilization of general color change, mixing by stirring was stopped, and the coated fine particles of Example 5 was obtained.

(Preparation of Fine Particle Dispersion)

The coated fine particles prepared above was converted into a dispersion by the method below. Using benzyl methacrylate and methacrylic acid as raw material, a type AB block polymer of an acid value of 250 and a number average molecular weight of 3,000 was prepared by conventional method, neutralized with potassium hydroxide solution, and diluted in ion-exchange water to give a homogeneous 50 mass % polymer solution.

180 g of the polymer solution described above, 100 g of the coated fine particles and 220 g of ion-exchange water were mixed and stirred mechanically for 0.5 hour. Then, using a micro fluidizer, this mixture was treated by passing through an interaction chamber five times under liquid pressure of about 10,000 psi (about 70 Mpa). In addition, the dispersion liquid prepared above was centrifuged (12,000 rpm, 20 minutes) to remove a non-dispersion including coarse particles, giving a dispersion.

(Ink)

The fine particle dispersion prepared above was used to manufacture an ink in the same manner as Example 1.

Comparative Example 1

Because the precursor of a porphyrin compound prepared in Example 3 was not soluble in water, 1 weight % of the precursor was dissolved in the solvent isopropanol, and the resulting solution was applied onto an alumina sheet prepared by applying an aqueous 50 weight % alumina dispersion solution onto PET-sheet followed by drying, as a receiving layer, and dried, and the dried matter was collected by raking and used in Comparative Example 1 as fine particles.

(Preparation of Fine Particle Dispersion)

The fine particle prepared above was converted into a dispersion by the method below. Using benzyl methacrylate and methacrylic acid as raw material, a type AB block polymer of an acid value of 250 and a number average molecular weight of 3,000 was prepared by conventional method, neutralized with potassium hydroxide solution, and diluted in ion-exchange water to give a homogeneous 50 mass % polymer solution.

180 g of the polymer solution described above, 100 g of the coated fine particles and 220 g of ion-exchange water were mixed and stirred mechanically for 0.5 hour. Then, using a micro fluidizer, this mixture was treated by passing through an interaction chamber five times under liquid pressure of about 10,000 psi (about 70 Mpa). In addition, the dispersion liquid prepared above was centrifuged (12,000 rpm, 20 minutes) to remove a non-dispersion including coarse particles, giving a dispersion to be used in Comparative Example 1.

(Ink)

The fine particle dispersion prepared above was used to manufacture an ink in the same manner as Example 1, and the ink was used in Comparative Example 1.

Comparative Example 2

A commercial powder of type β copper phthalocyanine pigment was used in Comparative Example 2 as fine particles. In addition, the fine particle was used to manufacture a dispersion by the method below.

First, using benzyl methacrylate and methacrylic acid as raw material, a type AB block polymer of an acid value of 250 and a number average molecular weight of 3,000 was prepared by conventional method, neutralized with potassium hydroxide solution, and diluted in ion-exchange water to give a homogeneous 50 mass % polymer solution.

180 g of the polymer solution described above, 100 g of the pigment powder and 220 g of ion-exchange water were mixed and stirred mechanically for 0.5 hour. Then, using a micro fluidizer, this mixture was treated by passing through an interaction chamber five times under liquid pressure of about 10,000 psi (about 70 Mpa). In addition, the dispersion liquid prepared above was centrifuged (12,000 rpm, 20 minutes) to remove a non-dispersion including coarse particles, giving fine particles dispersion to be used in Comparative Example 2.

(Preparation of Ink)

The fine particle dispersion for Comparative Example 2 prepared above was used to prepare an ink of the following composition for Comparative Example 2.

| Dispersion | 13.4% |
| Glycerine | 8% |
| Ethylene glycol | 7% |
| Isopropanol | 1% |
| Pure water | 70.6% |

Comparative Example 3

The phthalocyanine pigment used in Comparative Example 2 and hydrated alumina (mean particle size of primary particles: 15 nm) were mixed by stirring in pure water until a uniform mixture is attained, stirring was stopped, and water evaporated to give fine particles to be used in Comparative Example 3.

(Preparation of Fine Particles Dispersion)

The fine particle prepared above was used to manufacture a dispersion in the same manner as Example 1, and the dispersion was used in Comparative Example 3.

(Ink)

The dispersion prepared above was used to manufacture an ink in the same manner as Example 1, and the ink was used in Comparative Example 3.

<Evaluation>

(Evaluation of Crystal Thermostability)

The crystal state of pigment powders obtained in Examples 1 to 5 and Comparative Examples 1 to 3 that varied with temperature change was examined using XRD-DSC (available from Rigaku Co. Ltd.) as a commercial X-ray diffractometer (Rigaku Co. Ltd.) by increasing the temperature up to 300° C.

Figure 10:
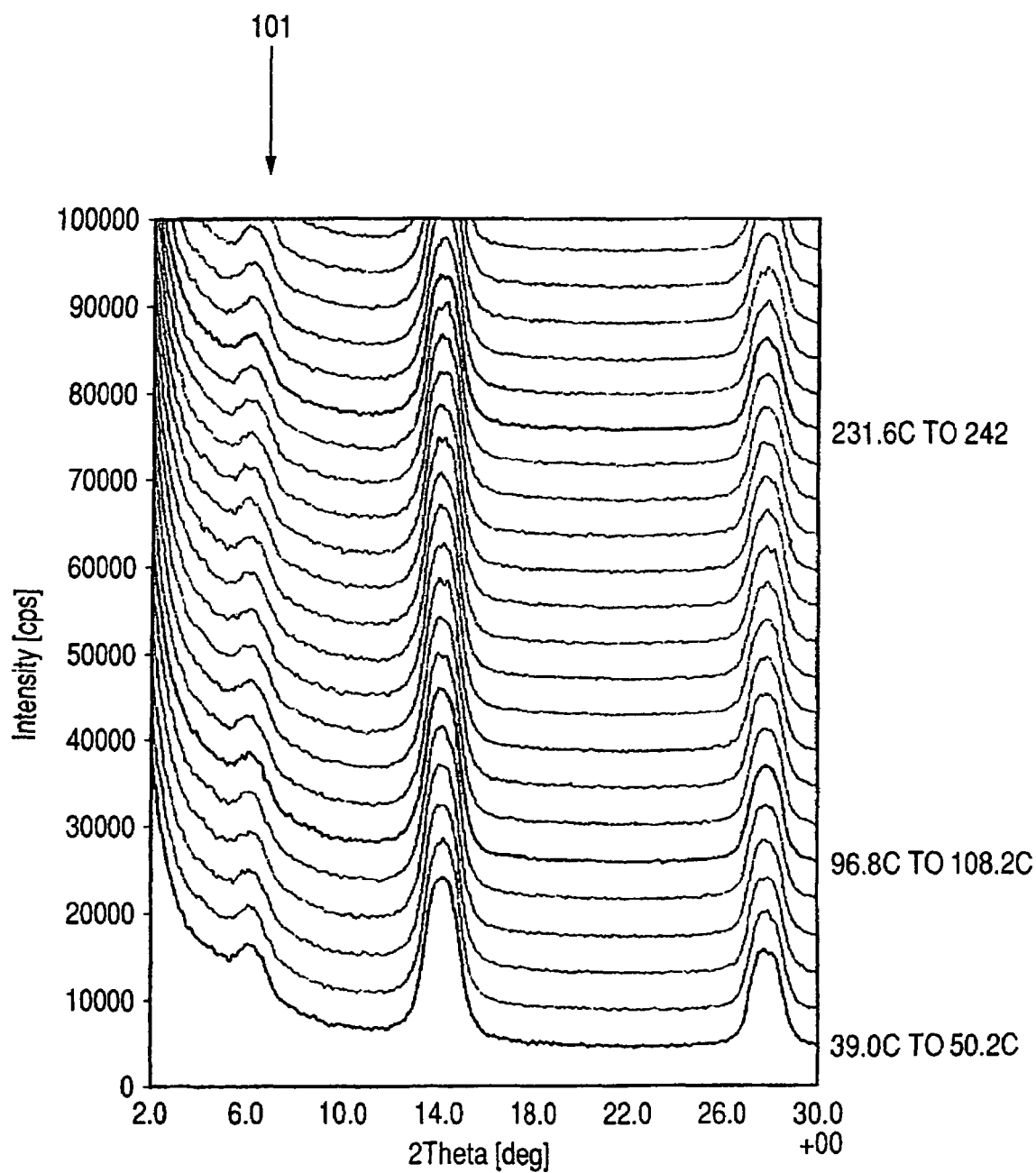
FIG. 10 is a chart showing XRD-DSC measurements of coated fine particles of Example 3.
Figure 11:
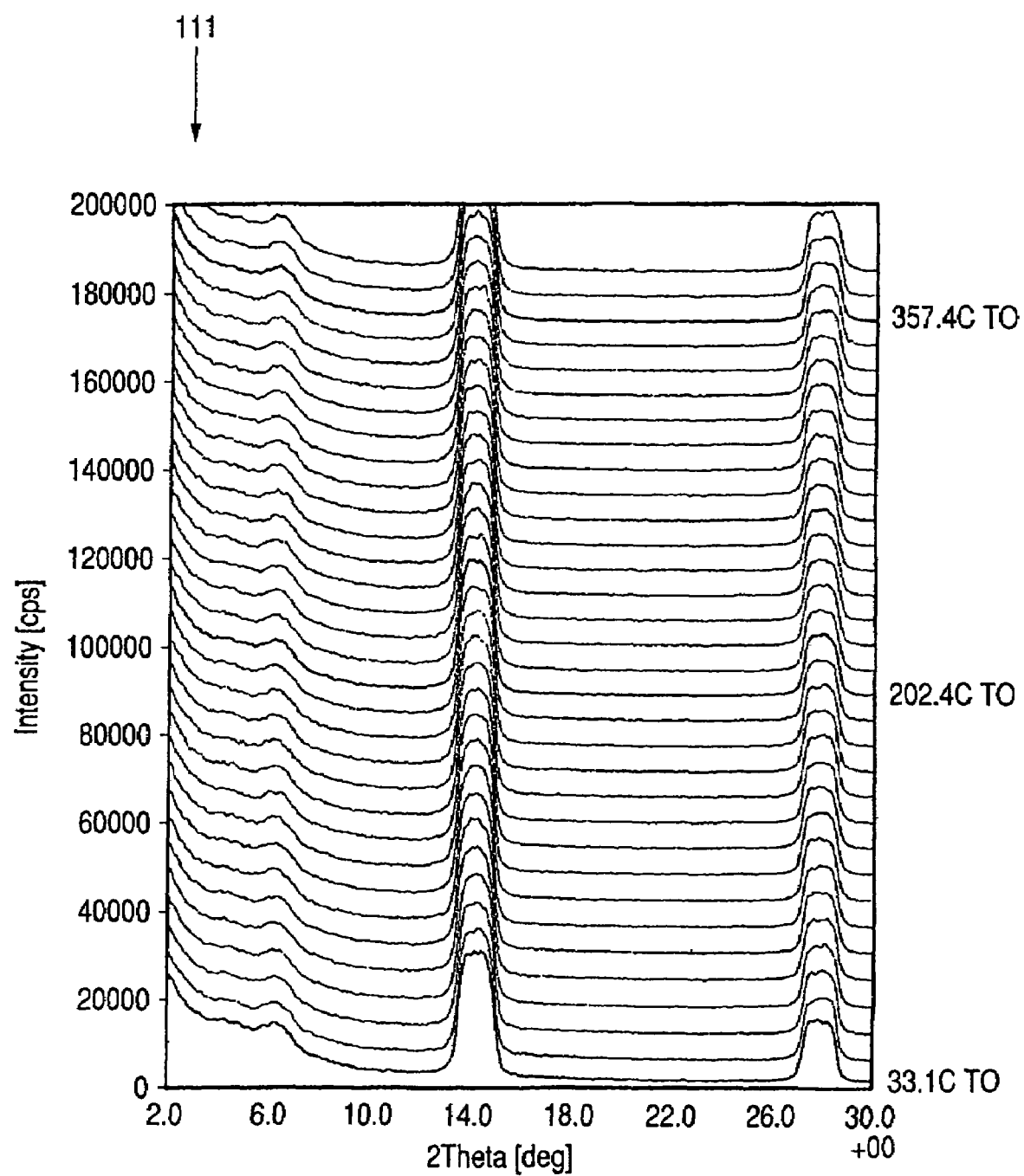
FIG. 11 is a chart showing XRD-DSC measurements of coated fine particles of Example 4.

No change in the crystal state was observed in the coated fine particles prepared in the examples even at temperatures up to 300° C., and monocrystal state was maintained. XRD-DSC measurement results from the coated fine particles prepared in Example 3 are shown in FIG. 10, and those from the coated fine particles prepared in Example 4 in FIG. 11. FIGS. 10 and 11 both present an unchanged crystal peak of porphyrin near $2\theta=6°$ at up to 300° C. For Examples 1, 2 and 5, no change in the crystal state with temperature change was observed either. In contrast, XRD-DSC measurement results showed that the fine particle prepared in Comparative Example 1 had a stronger peak intensity near $2\theta=6°$ as the temperature increased, and indicated a mixed state with crystals and non-crystals. In addition, the crystal peak was detected in some cases but not in others. Color irregularities were also observed on the recording material. XRD-DSC measurement results showed that the fine particle of Comparative Examples 2 and 3 had a mixed crystal state with $\alpha$ and $\beta$ types. In addition, the fine particle consisted of crystals of only the $\beta$ type when heated to 300° C.

(Evaluation of Crystal Stability after being Left)

15 g of coated fine particles, fine particle dispersions and inks obtained in Examples 1 to 5 and Comparative Examples 1 to 3 was placed in a glass dish, allowed to stand at 50° C. for one month without closing, and the change in crystal state was examined using a commercial X-ray diffractometer (Rigaku Co. Ltd.).

No change in the crystal state was observed for the fine particle dispersion and the ink of the examples even when water evaporated and a solid state was formed. No change was observed in the coated fine particles either. In contrast, the crystal peak intensity increased in the fine particle, fine particle dispersion and ink of Comparative Example 1. No change was observed in the fine particle dispersion and the ink of Comparative Examples 2 and 3.

(Evaluation of Stability)

The dispersion solution and ink obtained in Examples 1 to 5 and Comparative Examples 1 to 3 were placed in a closed glass vessel, allowed to stand at room temperature for one month, stirred sufficiently, and the changes in crystal state and particle size were examined using a commercial X-ray diffractometer (Rigaku Co. Ltd.) and a particle size distribution measuring instrument (Otsuka Denshi).

The dispersion solution and ink of the examples presented no change in crystal state or particle size distribution. In contrast, the dispersion and ink of Comparative Examples 1 to 3 both had a particle size distribution that shifted to higher levels, and increased particles of a larger size.

(Evaluation of Ejection Property)

The ink obtained in Examples 1 to 5 and Comparative Examples 1 to 3 was used until exhaustion to print alphanumeric characters on fine paper using as commercial ink-jet recording equipment BJF600 (trade name, available from Canon); the condition of the recorded matters was satisfactory without ejection error or kink. The inks from Comparative Examples 1 and 3 were incapable of printing. The ink from Comparative Example 2 produced some printing errors in mid-course.

(Evaluation of Color Development)

The ink obtained in Examples 1 to 5 and Comparative Examples 1 to 3 was used to print alphanumeric characters and monochromatic images on commercial fine paper using as commercial ink-jet recording equipment BJF600 (trade name, available from Canon); visual observation of the resultant recorded materials showed that the inks from the examples produced good color development without color irregularities and non-uniformity. Meanwhile, the inks from Comparative Examples 1 and 3 were incapable of printing. In addition, the ink from Comparative Example 2 exhibited color development of the same level as the examples.

(Evaluation of Color Development Stability)

The dispersion and ink obtained in Examples 1 to 5 and Comparative Examples 1 to 3 were placed in a closed glass vessel, allowed to stand at room temperature for one month, applied onto commercial fine paper, and color development was evaluated through visual observation. Those from the examples presented no change in color development. In contrast, the dispersion and ink from Comparative Example 2 presented some change in color development. In addition, samples from Comparative Examples 1 and 3 that were allowed to stand at room temperature for one month developed color change.

(Particle Size Distribution)

No difference in the mean particle size was observed for the three phases from Examples 1 to 5, i.e., the coated fine particles, fine particle dispersion and ink, and the distribution range was narrow.

For Comparative Examples 1 and 3, the mean particle size increased in order of ink<fine particle dispersion<coated fine particles, and was one order of magnitude larger than those from Examples 1 to 4. In addition, the distribution range was wide. Little difference was observed in the mean particle size for the three phases from Comparative Example 2, i.e., the coated fine particles, fine particle dispersion and ink.

The present invention is applicable to coloring materials for ink-jet recording, electrophotography and coating as well as to carriers for electrophotography and semiconductors.

This application claims the priority from Japanese Patent Application No. 2004-261698, filed on Sep. 8, 2004, which is hereby incorporated by reference herein.

What is claimed is:

1. A method for producing coated fine particles, comprising the steps of
    allowing metal fine particles made of any one of metal oxide, metal hydrate, and metal crystals to coexist with a compound precursor used for coating the metal fine particles,
    transforming a molecular structure of the compound precursor in coexistence with the metal fine particles, wherein the molecular structure is transformed by means of the retro Diels-Alder reaction, and
    forming, around the fine particles, a crystal coating of a compound obtained by the molecular structure transformation, wherein the crystal coating is formed by making use of the molecular structure transformation.

2. The method for producing coated fine particles according to claim 1, wherein the compound precursor has a structure of at least one selected from the general formulas (A-1), (A-2), (A-3), (A-4):

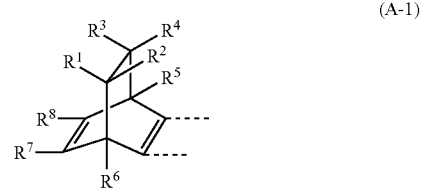

(A-1)

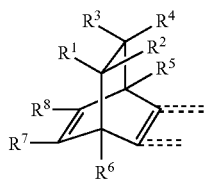 (A-2)
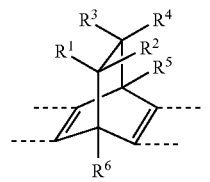 (A-3)
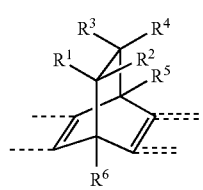 (A-4)
wherein $R^1$ to $R^4$ independently represent a hydrogen atom or a directly or indirectly bonded solvent soluble group, and $R^5$ to $R^8$ independently represent a hydrogen atom or a directly or indirectly bonded substituent.
\* \* \* \* \*

UNITED STATES PATENT AND TRADEMARK OFFICE
CERTIFICATE OF CORRECTION

PATENT NO. : 7,364,770 B2  Page 1 of 1
APPLICATION NO. : 11/367542
DATED : April 29, 2008
INVENTOR(S) : Akira Nagashima et al.

It is certified that error appears in the above-identified patent and that said Letters Patent is hereby corrected as shown below:

COLUMN 3
Line 9, "difficult" should read --is difficult--.
Line 10, "and stable" should read --and a stable--.
Line 32, "made" should read --be made--.

COLUMN 7
Line 22, "in organic" should read --inorganic--.
Line 42, "incapable" should read --incapable of--.

COLUMN 10
Line 41, "an" should read --a--.

Signed and Sealed this

Thirteenth Day of January, 2009

JON W. DUDAS
*Director of the United States Patent and Trademark Office*